United States Patent
Ahn et al.

(10) Patent No.: US 11,082,864 B2
(45) Date of Patent: Aug. 3, 2021

(54) METHOD FOR TRANSMITTING AND RECEIVING SIGNAL BY MEANS OF BEAM IN WIRELESS COMMUNICATION SYSTEM, AND APPARATUS FOR SAID METHOD

(71) Applicant: LG ELECTRONICS INC., Seoul (KR)

(72) Inventors: Minki Ahn, Seoul (KR); Jiwon Kang, Seoul (KR); Jonghyun Park, Seoul (KR); Kijun Kim, Seoul (KR); Haewook Park, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 16/608,809

(22) PCT Filed: May 3, 2018

(86) PCT No.: PCT/KR2018/005136
§ 371 (c)(1),
(2) Date: Oct. 25, 2019

(87) PCT Pub. No.: WO2018/203679
PCT Pub. Date: Nov. 8, 2018

(65) Prior Publication Data
US 2020/0196161 A1    Jun. 18, 2020

Related U.S. Application Data

(60) Provisional application No. 62/501,105, filed on May 4, 2017, provisional application No. 62/519,829, filed on Jun. 14, 2017.

(51) Int. Cl.
*H04W 16/28* (2009.01)
*H04W 24/10* (2009.01)
(Continued)

(52) U.S. Cl.
CPC .......... *H04W 16/28* (2013.01); *H04B 17/318* (2015.01); *H04L 5/0051* (2013.01);
(Continued)

(58) Field of Classification Search
None
See application file for complete search history.

(56) References Cited

U.S. PATENT DOCUMENTS

2017/0223689 A1* 8/2017 Son .................. H04B 7/0695
2019/0230569 A1* 7/2019 Kim ................. H04W 36/32
(Continued)

FOREIGN PATENT DOCUMENTS

WO    2015046895    4/2015

OTHER PUBLICATIONS

PCT International Application No. PCT/KR2018/005136, International Search Report dated Aug. 24, 2018, 3 pages.
(Continued)

*Primary Examiner* — Kenny S Lin
(74) *Attorney, Agent, or Firm* — Lee Hong Degerman Kang Waimey

(57) ABSTRACT

The present specification provides a method for transmitting and receiving a signal by means of a beam in a wireless communication system. Specifically, a method for a terminal for reporting beam-related information in a wireless communication system may comprise the steps of: receiving one or more particular signals for beam management from a base station; and reporting, to the base station, beam information for one or more beams on the basis of result of measurements by means of the one or more particular signals.

14 Claims, 8 Drawing Sheets

(51) Int. Cl.
  *H04B 17/318* (2015.01)
  *H04W 76/11* (2018.01)
  *H04L 5/00* (2006.01)
  *H04W 56/00* (2009.01)
  *H04W 80/08* (2009.01)

(52) U.S. Cl.
  CPC ......... *H04W 24/10* (2013.01); *H04W 56/001* (2013.01); *H04W 76/11* (2018.02); *H04W 80/08* (2013.01)

(56) References Cited

U.S. PATENT DOCUMENTS

| | | | | |
|---|---|---|---|---|
| 2019/0349784 | A1* | 11/2019 | Tang | H04L 5/0023 |
| 2019/0356378 | A1* | 11/2019 | Takeda | H04W 16/28 |
| 2020/0037269 | A1* | 1/2020 | Ryu | H04W 52/242 |
| 2020/0099437 | A1* | 3/2020 | Harada | H04W 76/19 |

OTHER PUBLICATIONS

Huawei, et al., "DL beam management", 3GPP TSG RAN WG1 Meeting #88b, R1-1704229, Apr. 2017, 12 pages.
Zte, et al., "Discussion on DL beam management", 3GPP TSG RAN WG1 Meeting #88bis, R1-1704398, Apr. 2017, 14 pages.
Catt, "Details of downlink beam management", 3GPP TSG RAN WG1 Meeting #88bis, R1-1704551, Apr. 2017, 10 pages.
Vivo, "Beam management and beam reporting", 3GPP TSG RAN WG1 Meeting #88bis, R1-1704488, Apr. 2017, 9 pages.

* cited by examiner (a)

(b)

METHOD FOR TRANSMITTING AND RECEIVING SIGNAL BY MEANS OF BEAM IN WIRELESS COMMUNICATION SYSTEM, AND APPARATUS FOR SAID METHOD

CROSS-REFERENCE TO RELATED APPLICATIONS

This application is the National Stage filing under 35 U.S.C. 371 of International Application No. PCT/KR2018/005136, filed on May 3, 2018, which claims the benefit of U.S. Provisional Application No. 62/501,105, filed on May 4, 2017, and 62/519,829, filed on Jun. 14, 2017, the contents of which are all hereby incorporated by reference herein in their entirety.

TECHNICAL FIELD

The present disclosure relates to a wireless communication system and, more particularly, to a method for transmitting and receiving signals using a beam and an apparatus supporting the same.

BACKGROUND ART

Mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method of performing a beam management procedure using a synchronization signal block, etc. and an apparatus therefor.

In relation to this, this specification proposes a method of performing a beam management procedure using a pre-configured cell identifier (ID) list and/or a pre-configured synchronization signal block(s) and an apparatus therefor.

Furthermore, this specification proposes a method of performing beam group reporting and an apparatus therefor.

In relation to this, this specification proposes a method of additionally reporting information for whether to report received power information (e.g., RSRP) corresponding to a beam index and/or a beam index and an apparatus therefor.

Technical objects of the present invention are not limited to the above-described technical objects, and other technical objects not described above may be evidently understood by those skilled in the art to which the present invention pertains from the following description.

Technical Solution

In a method of reporting, by a user equipment, beam-related information in a wireless communication system according to an embodiment of the present disclosure, the method includes receiving, from a base station, at least one specific signal for beam management and reporting, to the base station, beam information for one or more beams based on a measurement result by the at least one specific signal, wherein the one or more beams are configured as one or more beam groups, and wherein the beam information comprises information for whether to report information related to at least one beam included in each beam group.

Furthermore, in the method according to an embodiment of the present disclosure, the information related to the at least one beam may include at least one of a beam index of the at least one beam or received power information corresponding to the at least one beam.

Furthermore, the method according to an embodiment of the present disclosure may further include receiving, from the base station, configuration information for the number of the one or more beam groups and the number of the at least one beam included in each beam group reported by the user equipment.

Furthermore, in the method according to an embodiment of the present disclosure, the information for whether to report may include at least one of first bitmap information configured based on the number of one or more beam groups or second bitmap information configured based on the number of at least one beam.

Furthermore, in the method according to an embodiment of the present disclosure, whether to report may be determined based on a specific condition configured based on a preset specific threshold and received power information corresponding to a best beam.

Furthermore, in the method according to an embodiment of the present disclosure, if received power information corresponding to a specific beam meets the specific condition, a beam index of the specific beam may not be included in the beam information.

Furthermore, in the method according to an embodiment of the present disclosure, if received power information corresponding to a specific beam meets the specific condition, the received power information corresponding to the specific beam may not be included in the beam information.

Furthermore, in the method according to an embodiment of the present disclosure, information for whether to report a beam index of the at least one beam may be joint-encoded with an index of a beam group including the at least one beam.

Furthermore, in the method according to an embodiment of the present disclosure, the information for whether to report may include at least one of first flag information for whether to report a beam index or second flag information for whether to report received power information, for each beam.

Furthermore, the method according to an embodiment of the present disclosure may further include receiving, from the base station, a cell identifier list pre-configured to the beam management, receiving one or more synchronization signal blocks from at least one base station corresponding to at least one cell identifier included in the cell identifier list, and reporting, to the base station, a measurement result by the received one or more synchronization signal blocks.

Furthermore, in the method according to an embodiment of the present disclosure, the one or more synchronization signal blocks may be included in one or more synchronization signal bursts pre-configured by the base station, among a plurality of synchronization signal bursts transmitted by the at least one base station.

Furthermore, in the method according to an embodiment of the present disclosure, the pre-configured cell identifier list may be received through higher layer signaling.

Furthermore, in the method according to an embodiment of the present disclosure, the at least one specific signal may include at least one of a channel state information-reference signal, a beam reference signal, a measurement reference signal or a synchronization signal block.

Furthermore, in a user equipment reporting beam-related information in a wireless communication system according to an embodiment of the present disclosure, the user equipment includes a radio frequency (RF) module configured to transmit and receive radio signals and a processor functionally connected to the RF module. The processor is configured to receive, from a base station, at least one specific signal for beam management and report, to the base station, beam information for one or more beams based on a measurement result according to the at least one specific signal. The one or more beams are configured as one or more beam groups. The beam information may include information for whether to report information related to at least one beam included in each beam group.

Furthermore, in a method of reporting, by a user equipment, beam-related information in a wireless communication system according to an embodiment of the present disclosure, the method includes receiving, from a serving base station, a cell identifier list pre-configured for beam management, receiving one or more synchronization signal blocks from at least one neighbor base station corresponding to at least one cell identifier included in the cell identifier list and the serving base station, and reporting, to the serving base station, a measurement result by the received one or more synchronization signal blocks. The measurement result includes at least one of cell identifier information, index information of a synchronization signal block, or received power information.

Advantageous Effects

According to an embodiment of the present disclosure, there is an effect in that reporting overhead can be reduced because the payload size of beam-related information is reduced when a UE reports the beam-related information.

Furthermore, according to an embodiment of the present disclosure, there is an effect in that measurement complexity of a UE can be reduced because the UE performs measurement on a cell and/or a synchronization signal block configured by a base station.

Furthermore, according to an embodiment of the present disclosure, there is an effect of load balancing in a multi-cell (or transmit point) environment because a UE perform beam measurement for a specific direction of a cell (or transmit point) configured by a base station.

Advantages which may be obtained in the present invention are not limited to the aforementioned effects and other unmentioned advantages will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR INVENTION

Figure 1:
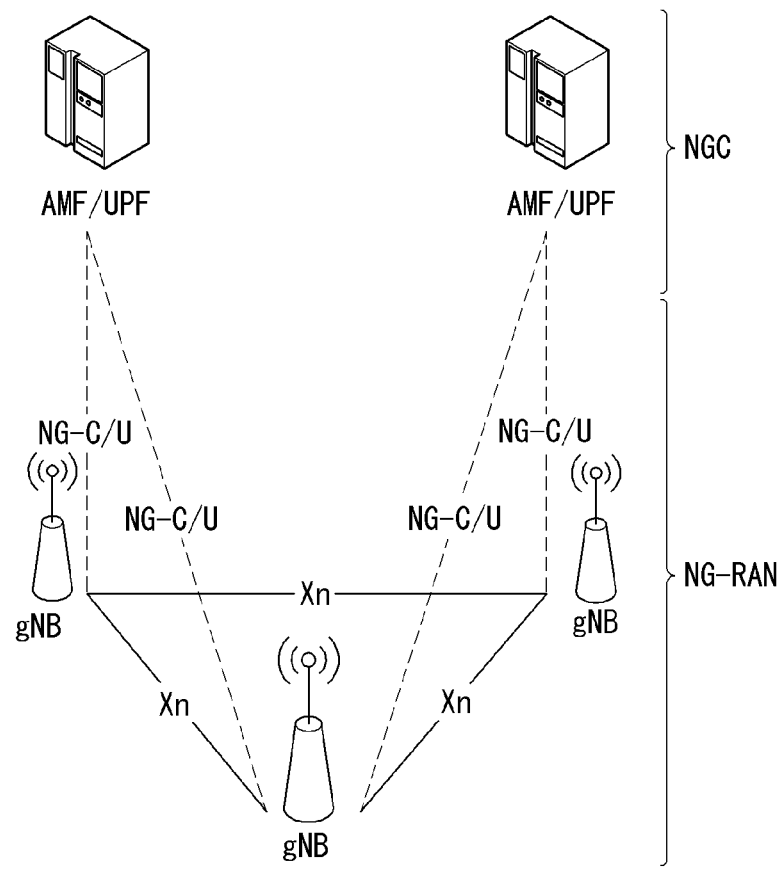
FIG. 1 is a diagram showing an example of a general system structure of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station.

The base station (BS) may be substituted with another term, such as a fixed station, a Node B, an evolved-NodeB (eNB), a base transceiver system (BTS), or an access point (AP). Furthermore, the terminal may be fixed or may have mobility and may be substituted with another term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to a UE, and uplink (UL) means communication from a UE to a base station. In the DL, a transmitter may be part of a base station, and a receiver may be part of a UE. In the UL, a transmitter may be part of a UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/NR(New RAT) is chiefly described, but the technical characteristics of the present disclosure are not limited thereto.

Definition of Terms eLTE eNB: eLTE eNB is the evolution of an eNB which supports a connection to EPC and NGC.

gNB: A node which supports not only a connection to NGC but also NR.

New RAN: A wireless access network which supports NR or E-UTRA or interacts with NGC.

Network slice: A network slice is a network defined by an operator to provide a solution optimized to a specific market scenario requiring specific requirements together with an end-to-end scope.

Network function: A network function is a logical node within network infrastructure having a well-defined external interface and a well-defined functional operation.

NG-C: A control plane interface used for an NG2 reference point between a new RAN and NGC.

NG-U: A user plane interface used for an NG3 reference point between a new RAN and NGC.

Non-standalone NR: A disposition configuration by which a gNB requires an LTE eNB as an anchor to establish a control plane connection to an EPC or by which a gNB requires an eLTE eNB as an anchor to establish a control plane connection to an NGC.

Non-standalone E-UTRA: A disposition configuration which requires a gNB as an anchor to establish a control plane connection to an NGC.

User plane gateway: An end-point of the NG-U interface.

System in General

FIG. 1 illustrates one example of the overall system structure of an NR to which a method proposed by the present specification may be applied.

Referring to FIG. 1, an NG-RAN is composed of an NG-RA user plane (a new AS sublayer/PDCP/RLC/MAC/PHY) and gNBs providing control plane (RRC) protocol endpoints for User Equipment (UE).

The gNBs are inter-connected through an Xn interface.

The gNBs are also connected to the NGC through the NG interface.

More specifically, the gNBs are connected to Access and Mobility Management Functions (AMFs) through the N2 interface and to User Plane Functions (UPFs) through the N3 interface.

New Rat (NR) Numerology and Frame Structure

In the NR system, a plurality of numerologies may be supported. In this case, the numerology may be defined by a subcarrier spacing and cyclic prefix (CP) overhead. In this case, a plurality of the subcarrier spacing may be derived by scaling a basic subcarrier spacing in integer N (or μ). Furthermore, although it is assumed that a very low subcarrier spacing is not used in a very high carrier frequency, a numerology used may be selected independently of a frequency band.

Furthermore, in the NR system, various frame structures according to a plurality of numerologies may be supported.

Hereinafter, orthogonal frequency division multiplexing (OFDM) numerologies and frame structures which may be taken into consideration in the NR system are described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In relation to a frame structure of the NR system, the size of various fields in a time domain is represented as a multiple of a time unit of $T_s=1/(\Delta f_{max} \cdot N_f)$. In this case, $\Delta f_{max}=480 \cdot 10^3$ and $N_f=4096$. Downlink and uplink transmission are configured with a radio frame having a period of $T_f=(\Delta f_{max}N_f/100)\cdot T_s=10$ ms. In this case, the radio frame is configured with 10 subframes having a period of each $T_{sf}=(\Delta f_{max}N_f/1000)\cdot T_s=1$ ms. In this case, there may be one set of frames for the uplink and one set of frames for the downlink.

Figure 2:
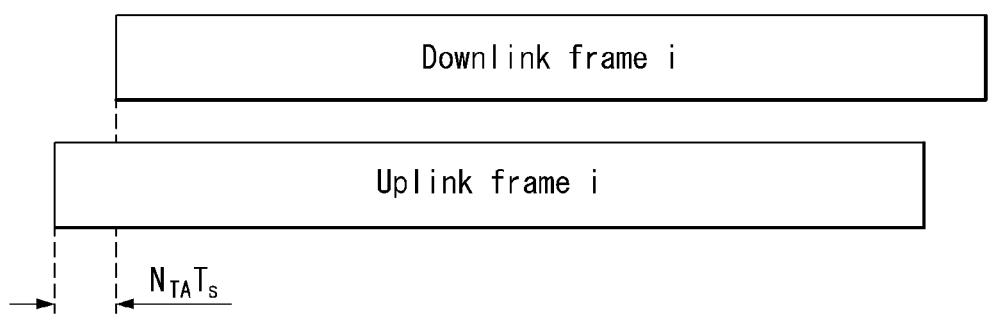
FIG. 2 shows the relation between an uplink frame and a downlink frame in a wireless communication system to which a method proposed in this specification may be applied.

FIG. 2 shows the relation between an uplink frame and a downlink frame in a wireless communication system to which a method proposed in this specification may be applied.

As shown in FIG. 2, the transmission of an uplink frame number i from a user equipment (UE) needs to be started prior to $T_{TA}=N_{TA}T_s$ compared to the start of a corresponding downlink frame in the corresponding UE.

With respect to a numerology μ, slots are numbered in order of higher $n_s^\mu \in \{0, \ldots, N_{subframe}^{slots,\mu}-1\}$ within a subframe, and the slots are numbered in order of higher $n_{s,f}^\mu \in \{0, \ldots, N_{frame}^{slots,\mu}-1\}$ within a radio frame. One slot is configured with contiguous $N_{symb}^\mu$ OFDM symbols, and $N_{symb}^\mu$ is determined based on a used numerology and slot configuration. The start of a slot $n_s^\mu$ within the subframe is temporally aligned with the start of an OFDM symbol $n_s^\mu N_{symb}^\mu$ in the same subframe.

All UEs cannot perform transmission and reception at the same time, and this means that all the OFDM symbols of a downlink slot or an uplink slot cannot be used.

Table 2 shows the number of OFDM symbols per slot for a normal CP in a numerology μ, and Table 3 shows the number of OFDM symbols per slot for an extended CP in the numerology μ.

First, in relation to the antenna port, the antenna port is defined so that a channel on which a symbol on the antenna port is carried is deduced from a channel on which a different symbol on the same antenna port is carried. If the large-scale property of a channel on which a symbol on one antenna port is carried can be deduced from a channel on which a symbol on a different antenna port is carried, the two antenna ports may be said to have a quasi co-located or quasi co-location (QC/QCL) relation. In this case, the large-scale property includes one or more delay spread, Doppler spread, a frequency shift, average received power, or received timing.

Figure 3:
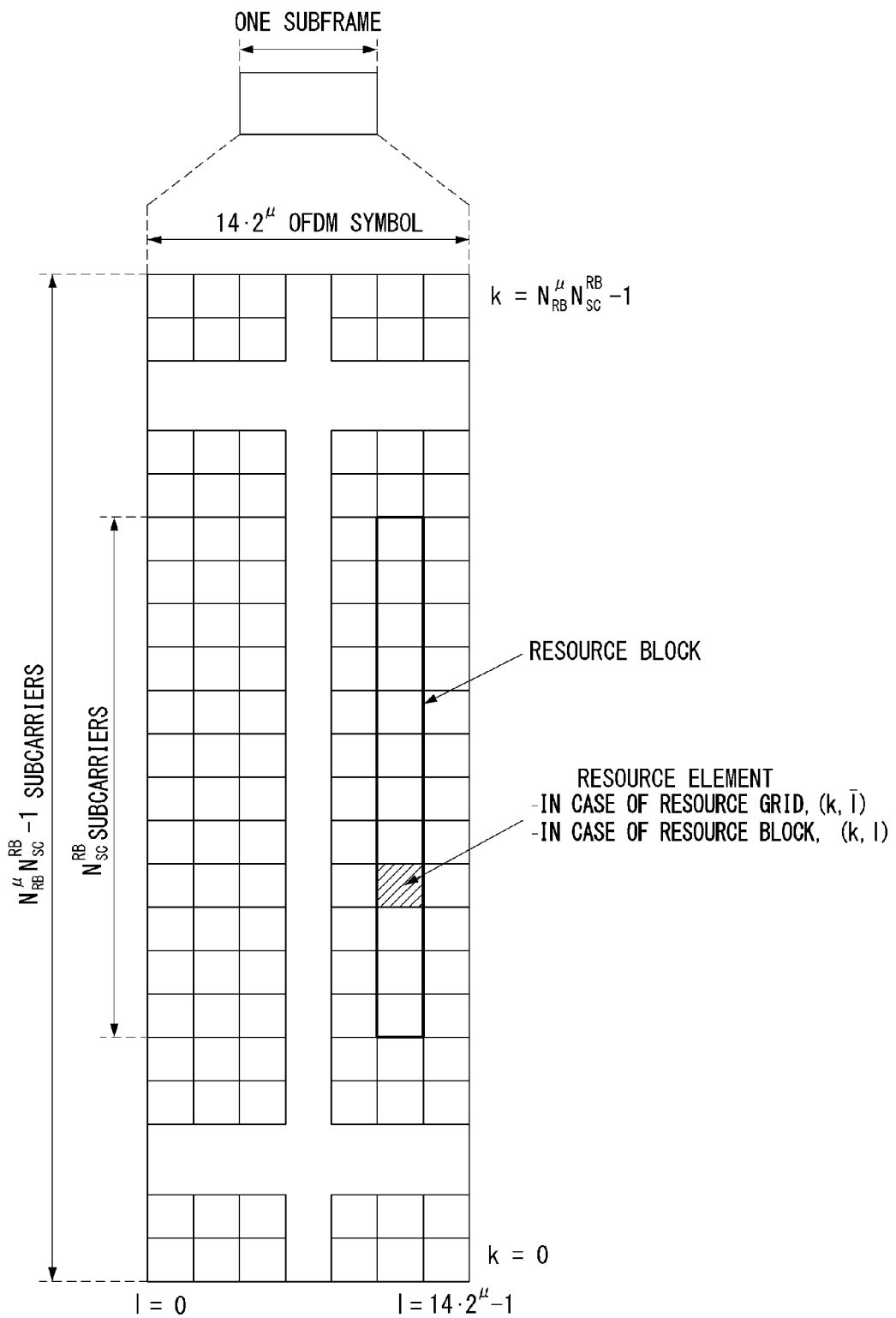
FIG. 3 shows an example of a resource grid supported in a wireless communication system to which a method proposed in this specification may be applied.

FIG. 3 shows an example of a resource grid supported in a wireless communication system to which a method proposed in this specification may be applied.

FIG. 3 illustrates that a resource grid is configured with $N_{RB}^\mu N_{sc}^{RB}$ subcarriers on a frequency domain and one subframe is configured with 14·2μ OFDM symbols, but is not limited thereto.

In an NR system, a transmitted signal is described by one or more resource grids configured with $N_{RB}^\mu N_{sc}^{RB}$ subcarriers and OFDM symbols of $2^\mu N_{symb}^{(\mu)}$. In this case, $N_{RB}^\mu \leq N_{RB}^{max,\mu}$. The $N_{RB}^{max,\mu}$ indicates a maximum transmission bandwidth, which may be different between the uplink and the downlink in addition to between numerologies.

Figure 4:
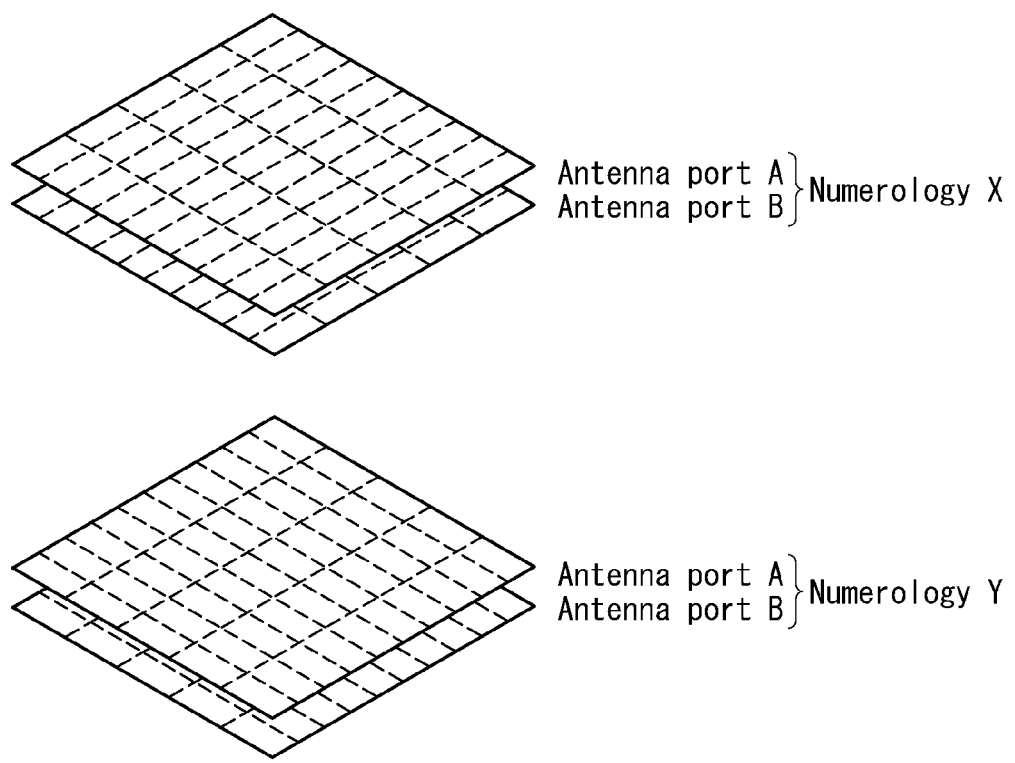
FIG. 4 shows examples of a resource grid for each antenna port and numerology to which a method proposed in this specification may be applied.

In this case, as in FIG. 4, one resource grid may be configured for each numerology μ and each antenna port p.

FIG. 4 shows examples of a resource grid for each antenna port and numerology to which a method proposed in this specification may be applied.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In relation to a physical resource of an NR system, an antenna port, a resource grid, a resource element, a resource block, a carrier part, etc. may be taken into consideration.

Hereinafter, physical resources which may be taken into consideration in the NR system are described specifically.

Each element of the resource grid for a numerology μ and an antenna port p is denoted as a resource element and uniquely identified by an index pair (k,l). In this case, k=0, ..., $N_{RB}^\mu N_{sc}^{RB}-1$ is an index on a frequency domain, and l=0, ..., $2^\mu N_{symb}^{(\mu)}-1$ denotes the position of a symbol within a subframe. When a resource element is denoted in a slot, an index pair (k,l) is used. In this case, l=0, . . . , $N_{symb}^\mu - 1$.

The resource element (k,l̄) for the numerology μ and the antenna port p corresponds to a complex value $a_{k,\bar{l}}^{(p,\mu)}$. If there is no danger of confusion or if a specific antenna port or numerology is not specified, indices p and μ may be dropped. As a result, a complex value may be $a_{k,\bar{l}}^{(p)}$ or $a_{k,\bar{l}}$.

Furthermore, a physical resource block is defined as contiguous $N_{sc}^{RB}=12$ subcarriers on a frequency domain. On the frequency domain, physical resource blocks are numbered from 0 to $N_{RB}^\mu - 1$. In this case, the relation between a physical resource block number $n_{PRB}$ and resource elements (k,l) on the frequency domain is given as in Equation 1.

$$n_{PRB} = \left\lfloor \frac{k}{N_{sc}^{RB}} \right\rfloor \quad \text{[Equation 1]}$$

Furthermore, in relation to a carrier part, a UE may be configured receive or transmit only a subset of a resource grid. In this case, a set of resource blocks configured to be received or transmitted by the UE is numbered from 0 to $N_{URB}^\mu - 1$ on the frequency domain.

Beam Management

In NR, beam management is defined as follows.

Beam management: a TRP(s) which may be used for DL and UL transmission and reception and/or a set of L1/L2 procedures for obtaining and maintaining a set of UE beams include at least the following contents:

Beam decision: an operation for a TRP(s) or a UE to select its own transmission/Rx beam.

Beam measurement: an operation for a TRP(s) or a UE to measure the characteristics of a received beamforming signal.

Beam reporting: an operation for a UE to report information on a beamformed signal based on beam measurement.

Beam sweeping: an operation of covering a space region using a Tx and/or Rx beam during a time interval according to a pre-determined method.

Furthermore, a Tx/Rx beam correspondence in a TRP and a UE is defined as follows.

A Tx/Rx beam correspondence in a TRP is maintained when at least one of the followings is satisfied.

A TRP may determine a TRP Rx beam for uplink reception based on the downlink measurement of a UE for one or more Tx beams of a TRP.

A TRP may determine a TRP Tx beam for downlink transmission based on the uplink measurement of a TRP for one or more Rx beams of the TRP.

A Tx/Rx beam correspondence in a UE is maintained when at least one of the followings is satisfied.

A UE may determine a UE Tx beam for uplink transmission based on the downlink measurement of a UE for one or more Rx beams of the UE.

A UE may determine a UE Rx beam for downlink reception based on the indication of a TRP based on uplink measurement for one or more Tx beams.

The capability indication of UE beam correspondence-related information is supported for a TRP.

The following DL L1/L2 beam management procedure is supported within one TRP or a plurality of TRPs.

P-1: this is used to enable UE measurement for different TRP Tx beams in order to support the selection of a TRP Tx beam/UE Rx beam(s).

In general, beamforming in a TRP includes intra/inter-TRP Tx beam sweep in different beam sets. For beamforming in a UE, it commonly includes UE Rx beam sweep from a set of different beams.

P-2: UE measurement for different TRP Tx beams is used to change an inter/intra-TRP Tx beam(s).

P-3: if a UE uses beamforming, UE measurement for the same TRP Tx beam is used to change a UE Rx beam.

Aperiodic reporting triggered by at least a network is supported in P-1-, P-2- and P-3-related operations.

UE measurement based on an RS (at least a CSI-RS) for beam management is configured with K (a total number of beams) beams. A UE reports a measurement result of selected N Tx beams. In this case, N is not an essentially fixed number. A procedure based on an RS for a mobility object is not excluded. Reporting information includes at least a measurement quantity for an N beam(s) and information indicating an N DL Tx beam when N<K. Particularly, a UE may report a CSI-RS resource indicator (CRI) of N' with respect to K'>1 non-zero power (NZP) CSI-RS resources.

A UE may be configured with the following higher layer parameters for beam management.

N≥1 reporting setting, M≥1 resource setting

Links between reporting settings and resource settings are configured in an agreed CSI measurement configuration.

P-1 and P-2 based on a CSI-RS are supported as resource and reporting settings.

P-3 may be supported regardless of whether a reporting setting is present.

Reporting setting including at least the following contents

Information indicating a selected beam

L1 measurement reporting

A time domain operation (e.g., aperiodic operation, periodic operation, semi-persistent operation)

Frequency granularity when several frequency granularities are supported

Resource setting including at least the following contents

A time domain operation (e.g., an aperiodic operation, a periodic operation, semi-persistent operation)

RS type: at least an NZP CSI-RS

At least one CSI-RS resource set. Each CSI-RS resource set may include K≥1 CSI-RS resources (some parameters of K CSI-RS resources may be the same. For example, a port number, a time domain operation, density and a period)

Furthermore, NR supports the following beam reporting by taking into consideration an L group where L>1.

Information indicating a minimum group

A measurement quantity for an N1 beam (support L1 RSRP and CSI report (if a CSI-RS is for CSI acquisition))

If applicable, information indicating $N_1$ DL Tx beams

Group-based beam reporting, such as that described above, may be configured in a UE unit. Furthermore, the group-based beam reporting may be turned off in a UE unit (e.g., when L=1 or $N_1$=1).

NR supports that a UE can trigger a mechanism for recovery from a beam failure.

A beam failure event occurs when the quality of a beam pair link of an associated control channel is sufficient low (e.g., a comparison with a threshold and the timeout of an associated timer). The mechanism for recovery from a beam failure (or obstacle) is triggered when a beam obstacle occurs.

A network explicitly configures a resource for transmitting an UL signal with respect to a UE for a recovery object. The configuration of resources is supported at the place where an eNB listens to the resources from all or some of directions (e.g., random access region).

An UL transmission/resource reporting a beam obstacle may be positioned at the same time instance as that of a PRACH (resource orthogonal to a PRACH resource) or at time instance (configurable for a UE) different from that of a PRACH. The transmission of a DL signal is supported so that a UE can monitor a beam in order to identify new potential beams.

NR supports beam management regardless of beam-related indication. If beam-related indication is provided, information on a UE-side beamforming/reception procedure used for CSI-RS-based measurement may be indicated for a UE through QCL. Parameters for delay, Doppler, and an average gain used in the LTE system and a spatial parameter for beamforming in a receiver will be added as a QCL parameter to be supported in NR. The QCL parameter may include a parameter related to an angle of arrival in a UE Rx beamforming viewpoint and/or parameters related to an angle of departure in an eNB Rx beamforming viewpoint.

In the NR, parameters related to the angle of arrival will be commonly referred to as a spatial RX parameter. That is, that a specific antenna port is QCLed from another antenna port in a spatial rx parameter viewpoint means that a receiver receiving the two antenna ports may use the same rx beam (spatial filter). This is same as informing the UE that the base station may apply the same or similar transmission beam when transmitting the two antenna ports in downlink viewpoint.

NR supports that the same or different beams are used for control channel and corresponding data channel transmission.

For NR-PDCCH transmission supporting the robustness of beam pair link blocking, a UE may be configured to monitor NR-PDCCHs on an M-beam pair link at the same time. In this case, a maximum value of M≥1 and M may depend on at least UE capability.

A UE may be configured to monitor an NR-PDCCH on a different beam pair link(s) in different NR-PDCCH OFDM symbols. A parameter related to UE Rx beam setting for monitoring an NR-PDCCH on a plurality of beam pair links is configured by higher layer signaling or a MAC CE and/or is taken into consideration in the search space design.

At least, NR supports the indication of a spatial QCL assumption between a DL RS antenna port(s) and a DL RS antenna port(s) for the demodulation of a DL control channel. A candidate signaling method for beam indication for an NR-PDCCH (i.e., a configuration method of monitoring an NR-PDCCH) includes MAC CE signaling, RRC signaling, DCI signaling, a spec. transparent and/or implicit method, and a combination of the signaling methods.

For the reception of a unicast DL data channel, NR supports the indication of a spatial QCL assumption between a DL RS antenna port and the DMRS antenna port of a DL data channel.

Information indicating an RS antenna port is indicated through DCI (downlink permission). Furthermore, the information indicates an RS antenna port QCLed with a DMRS antenna port. A different set of DMRS antenna ports for a DL data channel may be indicated as QCL with a different set of RS antenna ports.

Hereinafter, prior to the detailed description of methods proposed in this specification, contents related to the methods proposed in this specification directly/indirectly are first described in brief.

In next-generation communication, such as 5G or New Rat (NR), as more communication devices require a higher communication capacity, there is a need for enhanced mobile broadband communication compared to the existing radio access technology (RAT).

Furthermore, massive machine type communications (MTC) that provides various services anywhere and at any time by connecting a plurality of devices and things is also one of important issues that may be taken into consideration in the next-generation communication.

Furthermore, the design or structure of a communication system in which service and/or a UE sensitive to reliability and latency are taken into consideration is discussed.

As described above, the introduction of the next-generation radio access technology (RAT) in which enhanced mobile broadband (eMBB) communication, massive MTC (mMTC), and ultra-reliable and low latency communication (URLLC) are taken into consideration is being discussed. In this specification, the corresponding technology is generally called "new RAT (NR)", for convenience sake.

OFDM Numerology in NR

A new RAT system uses an OFDM transmission method or a transmission method similar to the method, and has an OFDM numerology of Table 4 representatively.

That is, Table 4 shows an example of OFDM parameters of a New RAT system.

TABLE 4

| Parameter | Value |
| --- | --- |
| Subcarrier-spacing ($\Delta f$) | 60 kHz |
| OFDM symbol length | 16.33 us |
| Cyclic Prefix(CP) length | 1.30 us/1.17 us |
| System BW | 80 MHz |
| No. of available subcarriers | 1200 |
| Subframe length | 0.25 ms |
| Number of OFDM symbol per Subframe | 14 symbols |

Analog Beamforming

In a millimeter wave (mmW), multiple antenna elements may be installed in the same area because a wavelength is short.

That is, in a 30 GHz band, a wavelength is 1 cm, and a total of 64 (8×8) antenna elements may be installed in a panel of 4×4 cm at intervals of 0.5 lambda (wavelength) in a 2-dimensional array form.

Therefore, in mmW, coverage is increased or throughput is improved by raising a beamforming (BF) gain using multiple antenna elements.

In this case, if each antenna element has a transceiver unit (TXRU) so that transmission power and a phase can be adjusted, independent beamforming is possible for each frequency resource.

However, there is a problem in that effectiveness is low in terms of the price if TXRUs are installed in all of 100 antenna elements.

Therefore, a method of mapping multiple antenna elements to one TXRU and adjusting the direction of a beam using an analog phase shifter is taken into consideration.

Such an analog beamforming method has a disadvantage in that it cannot perform frequency-optional beamforming because only one beam direction can be formed in a full band.

For this reason, hybrid BF (HBF) having the number of BTXRUs smaller than Q antenna elements in the middle form of digital BF and analog BF may be taken into consideration.

HBF is different depending on a method of connecting B TXRUs and Q antenna elements, but the direction of beams that may be transmitted at the same time is limited to B or less.

Figure 5:
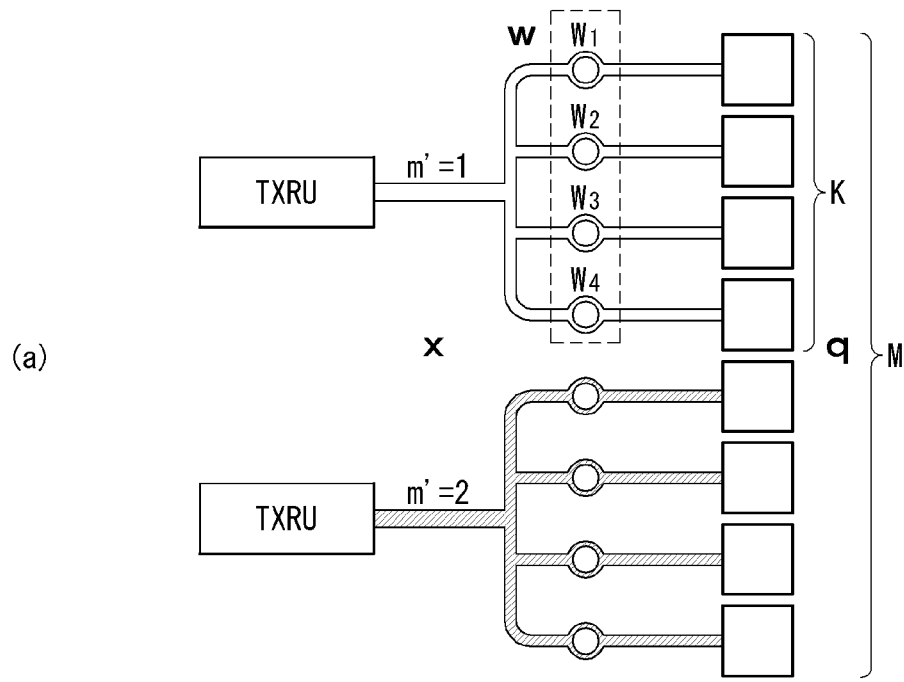
FIG. 5 shows examples of a connection method of a TXRU and an antenna element.
Figure 5:
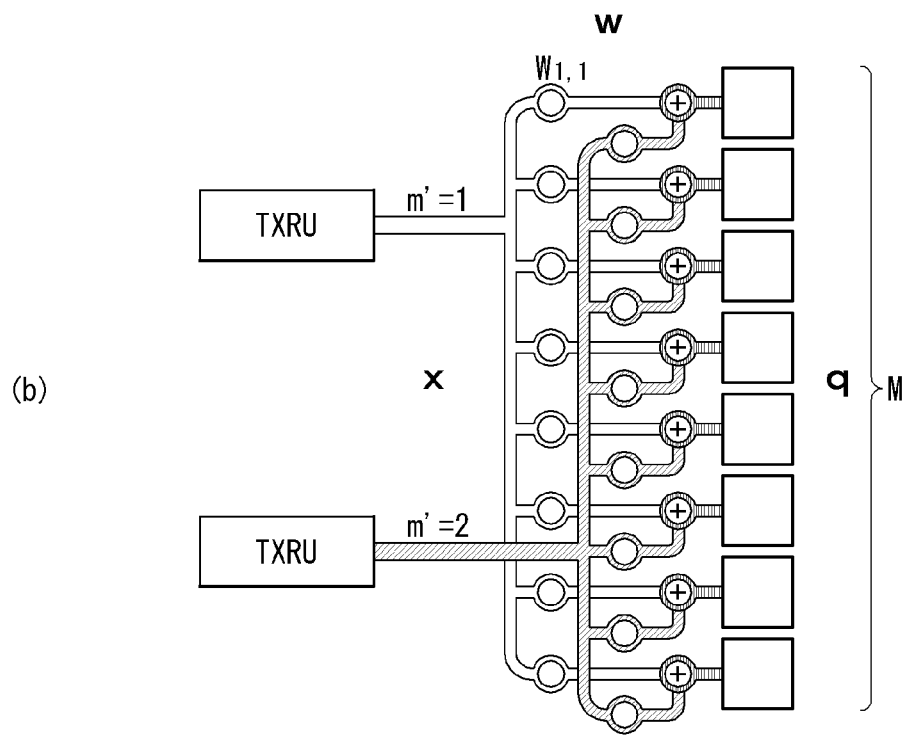

FIG. 5 shows examples of a connection method of a TXRU and an antenna element.

In this case, a TXRU virtualization model shows the relation between the output signal of a TXRU and the output signals of antenna elements.

FIG. 5a shows an example of a method of connecting a TXRU to a sub-array.

Referring to FIG. 5a, an antenna element is connected to only one TXRU. Unlike FIG. 5a, FIG. 5b shows a method of connecting TXRUs to all antenna elements.

That is, in the case of FIG. 5b, the antenna elements are connected to all TXRUs.

In FIG. 5, W indicates a phase vector multiplied by an analog phase shifter.

That is, the direction of analog beamforming is determined by W. In this case, mapping between CSI-RS antenna ports and TXRUs may be 1-to-1 or 1-to-many.

Reference Signal (RS) Virtualization

In mmW, PDSCH transmission is possible in one analog beam direction at one timing by analog beamforming.

Therefore, an eNB transmits data to only some UEs in a specific direction.

Accordingly, data transmission may be performed to a plurality of UEs in several analog beam directions at the same time by differently configuring analog beam directions for each antenna port, if necessary.

Figure 6:
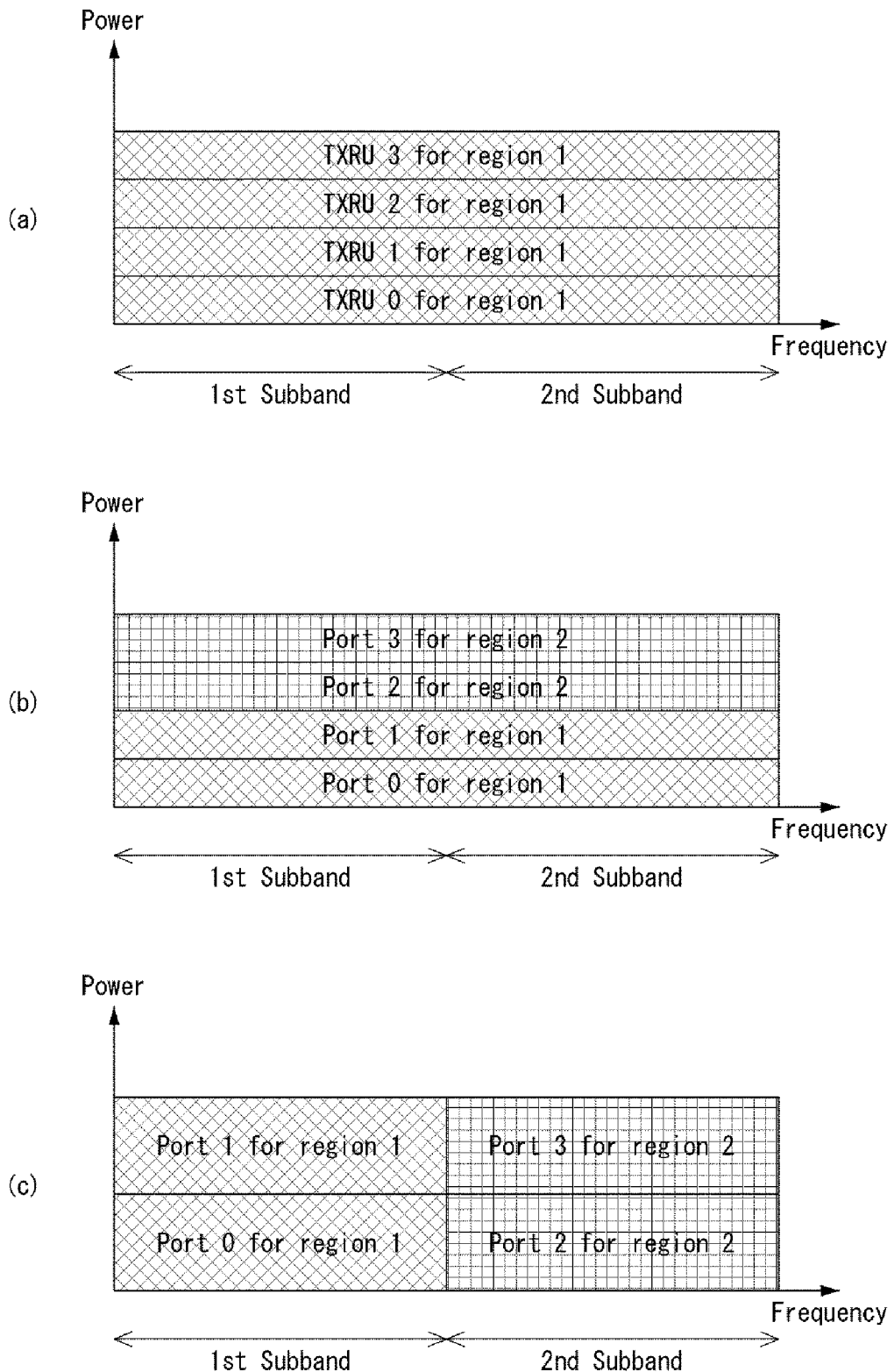
FIG. 6 shows various shows examples of a service area for each TXRU.

FIG. 6 shows various shows examples of a service region for each TXRU.

FIG. 6 shows an example of a structure in which 256 antenna elements are equally divided into four parts to form four sub-arrays and a TXRU is connected to each sub-array.

If each sub-array is configured with a total of 64 (8×8) antenna elements in a 2-dimensional array form, a region corresponding to a horizontal angle region of 15 degrees and a vertical angle region of 15 degrees may be covered by specific analog beamforming.

That is, a region that needs to be served by an eNB is divided into multiple regions, and the regions are served one by one at once.

In the following description, it is assumed that a CSI-RS antenna port and a TXRU are 1-to-1 mapped.

Accordingly, an antenna port and a TXRU may be construed as having the same meaning.

As in FIG. 6a, if all TXRUs (antenna ports, sub-array) have the same analog beamforming direction, the throughput of a corresponding region may be increased by forming a digital beam having higher resolution.

Furthermore, the throughput of a corresponding region may be increased by increasing the rank of transmission data to the corresponding region.

Furthermore, as in FIG. 6b, if each TXRU (antenna port, sub-array) has a different analog beamforming direction, UEs distributed to a wider area can transmit data at the same time in a corresponding subframe (SF).

As shown in FIG. 6b, two of four antenna ports are used by a UE1 in a region 1 for PDSCH transmission, and the remaining two thereof is used by a UE2 in a region 2 for PDSCH transmission.

Furthermore, FIG. 6b shows an example in which a PDSCH 1 transmitted to the UE1 and a PDSCH 2 transmitted to the UE2 has been spatial-division multiplexed (SDM).

In contrast, as in FIG. 6c, the PDSCH 1 transmitted to the UE1 and the PDSCH 2 transmitted to the UE2 may be frequency-division multiplexed (FDM) and transmitted.

From among a method of providing service to one region using all antenna ports and a method of dividing antenna ports and serving several regions at the same time, a preferred method may be different depending on a rank and MCS served to a UE in order to maximize cell throughput.

Furthermore, a preferred method is different depending on the amount of data to be transmitted to each UE.

An eNB calculates a cell throughput or scheduling metric which may be obtained when one region is served using all antenna ports, and calculates a cell throughput or scheduling metric which may be obtained when antenna ports are divided and two regions are served.

An eNB selects the final transmission method by comparing the cell throughputs or scheduling metrics which may be obtained through the two methods.

As a result, the number of antenna ports participating in PDSCH transmission in an SF-by-SF is different.

An eNB calculates the transmission MCS of a PDSCH according to the number of antenna ports, and requires suitable CSI feedback from a UE in order to incorporate the CSI feedback into a scheduling algorithm.

CSI Feedback

In the 3GPP LTE (-A) system, it has been defined that a UE reports channel state information (CSI) to a BS.

In this case, the channel state information (CSI) generally refers to information which may indicate the quality of a radio channel (or also called a "link") formed between the UE and an antenna port.

For example, a rank indicator (RI), a precoding matrix indicator (PMI), or a channel quality indicator (CQI) corresponds to the information.

In this case, the RI indicates rank information of a channel. This means the number of streams received by a UE through the same time-frequency resource. The value is determined by long-term fading of a channel, and is fed back from a UE to a BS with a longer period than the PMI or CQI.

The PMI is a value into which channel spatial characteristics have been incorporated, and indicates a precoding index preferred by a UE based on metric, such as an SINR.

The CQI is a value indicating the intensity of a channel. In general, the CQI means a received SINR which may be obtained when a BS uses a PMI.

In the 3GPP LTE (-A) system, a BS may configure multiple CSI processes for a UE, and may receive reporting for CSI for each process.

In this case, the CSI process is configured with a CSI-RS for specifying signal quality from the BS and a CSI-interference measurement (CSI-IM) resource for interference measurement.

Tx-Rx Beam Association

A network may transmit a known signal (e.g., a measurement reference signal (MRS), a beam reference signal (BRS), or a beamformed channel state information reference signal (CSI-RS) to which each beam has been applied in order for a UE to perform measurement on beams to be used in a corresponding cell (or may be used by an eNB), which is hereinafter generally called a "BRS", for convenience of description) aperiodically/periodically.

Furthermore, a UE may select an eNB Tx beam suitable for the UE through the measurement of a BRS.

If up to the Rx beam of a UE is taken into consideration, the UE may perform measurement using different Rx beams, and may select a beam combination(s) by taking into consideration the Tx beam of an eNB and the Rx beam of the UE.

After such a process is performed, the Tx-Rx beam association of the eNB and the UE may be determined explicitly or implicitly.

(1) Network Decision Based Beam Association

A network may indicate that a UE reports a higher XTx-Rx beam combination as a measurement result with respect to the UE. In this case, the number of reported beam combinations may be pre-defined or may be signaled by the network (through high layer signaling) or all of beam combinations in which the measurement result exceeds a specific threshold may be reported.

In this case, the specific threshold may be pre-defined or may be signaled by the network. If each UE has different decoding performance, a category may be defined by taking into consideration the decoding performance of the UE, and a threshold for each category may be defined.

Furthermore, reporting on a beam combination may be performed by the indication of a network periodically and/or aperiodically. Alternatively, if a previous report result and a current measurement result vary by a given level or higher, event-triggered reporting may be performed. In this case, the given level may be pre-defined or may be signaled by a network (through high layer signaling).

A UE may report (one or a plurality of) beam associations determined by the above-described method. If a plurality of beam indices is reported, priority may be assigned to each beam. For example, the beam indices may be reported so that they are interpreted in a form, such as the first (1st) preferred beam and the second (2nd) preferred beam.

(2) UE Decision Based Beam Association

In the UE decision based beam association, the preferred beam reporting of a UE may be performed using the same method as the above-described explicit beam association.

Rx Beam Assumption for the Measurement

Additionally, the best beam(s) reported by a UE may be a measurement result when one Rx beam is assumed or may be a measurement result when a plurality of Rx beams is assumed. The assumption of an Rx beam may be configured by a network.

For example, if a network has indicated that three measurement results should be reported assuming one Rx beam, a UE may perform measurement using all Rx beams, may select the best (eNB) Tx beam of the measurement results, and may report the 1st, 2nd, 3rd best results among measurement results according to an Rx beam used for a corresponding Tx beam measurement.

Furthermore, a reported measurement result may be limited to exceed a specific threshold. For example, if a beam having a measurement value (may be pre-defined or set by a network) exceeding a specific threshold, among the 1st, 2nd, 3rd best beams measured by a UE using a specific Rx beam, is only the 1st best beam, the UE may report only the 1st best beam to a BS.

Quasi Co-Location (QCL)

A method of demodulating, by a UE, data (e.g., PDSCH) as a UE-specific RS, such as a specific DMRS, when the UE receives the data is taken into consideration. Such a DMRS is transmitted with respect to only a scheduled RB(s) of a corresponding PDSCH and is transmitted for only a time period in which a scheduled PDSCH is transmitted. Accordingly, there may be a limit to reception performance in performing channel estimation using only a corresponding DMRS itself.

For example, in performing channel estimation, an estimation value of a major large-scale parameter (LSP) of a radio channel is necessary. DMRS density may be insufficient in obtaining the estimation value using only a DMRS present in a time/frequency domain in which a scheduled PDSCH is transmitted.

Accordingly, in order to support such an implementation of a UE, LTE-A supports methods of defining the following quasi co-location signaling/assumption/behaviors between RS ports and configuring/operating a UE based on the quasi co-location signaling/assumption/behavior.

That is, if the large-scale characteristic of a channel in which a symbol on one antenna port is transmitted can be deduced from a channel in which a symbol on a different antenna port is transmitted, the two antenna ports are said to have been quasi co-located (QCL).

In this case, the large-scale characteristic includes one or more of delay spread, Doppler spread, a Doppler shift, an average gain or an average delay.

Furthermore, a UE may assume the antenna ports 0 to 3, and an antenna port for the primary/secondary sync signal of a serving cell has been QCLed with a Doppler shift and average delay.

PDSCH (Physical Downlink Shared Channel) Resource Mapping Parameters

A UE configured with the transmission mode 10 for a given serving cell may be configured up to 4 parameter sets by higher layer signaling in order to decode a PDSCH according to a detected PDCCH/EPDCCH having DCI format 2D intended by the UE and the given serving cell. In order to determine PDSCH RE mapping and if the UE has been configured as a Type B QCL type, the UE will use a parameter configured based on a value of a "PDSCH RE Mapping and Quasi-Co-Location indicator" field in the PDCCH/EPDCCH having the DCI format 2D in order to determine a PDSCH antenna port QCL.

In the case of a PDSCH not having a corresponding PDCCH/EPDCCH, the UE will use a parameter set indicated in a PDCCH/EPDCCH having a DCI format 2D corresponding to associated SPS activation in order to determine the PDSCH RE mapping and the PDSCH antenna port QCL.

Table 5 shows PDSCH RE mapping and Quasi-Co-Location Indicator fields in the DCI format 2D.

TABLE 5

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining the PDSCH RE mapping and the PDSCH antenna port QCL are configured through higher layer signaling for each parameter set:

crs-PortsCount-r11
crs-FreqShift-r11
mbsfn-SubframeConfigList-r11
csi-RS-ConfigZPId-r11 pdsch-Start-r11
qcl-CSI-RS-ConfigNZPId-r11
If a UE is configured as a higher layer parameter eMIMO-Type for a TDD serving cell, zeroTxPowerCSI-RS2-r12

Antenna Port QCL for PDSCH

A UE configured as the transmission modes 8-10 of a serving cell may assume that the antenna ports 7-14 of the serving cell are QCL with a given subframe with respect to delay spread, Doppler spread, a Doppler shift, an average gain and average delay.

A UE configured as the transmission modes 1-9 of a serving cell may assume that the antenna ports 0-3, 5, 7-30 of the serving cell are QCL with respect to Doppler shift, Doppler spread, average delay, and delay spread.

A UE configured as the transmission mode 10 of a serving cell is configured as one of 2 QCL types for the serving cell according to a higher layer parameter QCL operation in order to decode a PDSCH using a transmission method related to the antenna ports 7-14:

Type A: a UE may assume that the antenna ports 0-3, 7-30 of a serving cell are QCL with respect to delay spread, Doppler spread, Doppler shift, and average delay.

Type B: a UE may assume that the antenna ports 15-30, corresponding to a CSI-RS resource configuration identified by a higher layer parameter qcl-CSI-RS-ConfigNZPId-r11, and the antenna ports 7-14 associated with a PDSCH are QCL with respect to Doppler shift, Doppler spread, average delay, and delay spread.

In the case of an LAA Scell, a UE does not expect that the LAA Scell will be configured as a QCL type B.

Channel-State Information—Reference Signal (CSI-RS) Definition

With respect to a serving cell and a UE configured as the transmission mode 9 and not configured as a higher layer parameter eMIMO-Type, the UE may be configured as one CSI-RS resource configuration.

With respect to a serving cell and a UE which has been configured as the transmission mode 9 and configured as a higher layer parameter eMIMO-Type and in which eMIMO-Type has been set as "Class A", the UE may be configured as one CSI-RS resource configuration.

With respect to a serving cell and a UE which has been configured as the transmission mode 9 and configured as a higher layer parameter eMIMO-Type and in which eMIMO-Type has been set as "Class B", the UE may be configured as one or more CSI-RS resource configuration.

With respect to a serving cell and a UE configured as the transmission mode 10, the UE may be configured as one or more CSI-RS resource configuration(s). The following parameters whose non-zero transmission power needs to be assumed by a UE with respect to a CSI-RS is configured through higher layer signaling for each CSI-RS resource configuration:

When a UE is configured as the transmission mode 10, a CSI-RS resource configuration identity
The number of CSI-RS ports
CSI RS configuration
CSI RS subframe configuration $I_{CSI-RS}$
If a UE has been configured as the transmission mode 9, a UE assumption for reference PDSCH transmission power $P_c$ for CSI feedback
If a UE has been configured as the transmission mode 10, a UE assumption for reference PDSCH transmission power $P_c$ for CSI feedback with respect to each CSI process If CSI subframe sets $C_{CSI,0}$ and $C_{CSI,1}$ have been configured as higher layer signaling with respect to one CSI process, $P_c$ is configured with respect to each CSI subframe set of a corresponding CSI process.

Pseudo-random sequence generator parameter $n_{ID}$

If a UE is configured as a higher layer parameter eMIMO-Type and the eMIMO-Type is set as "Class A" with respect to a CSI process, a CDM type parameter.

If a UE has been configured as the transmission mode 10, a UE assumption of a higher layer parameter qcl-CRS-Info-r11CRS for the QCL type B, a CRS antenna port and CSI-RS antenna ports having the following parameters:

qcl-ScramblingIdentity-r11.
crs-PortsCount-r11.
mbsfn-SubframeConfigList-r11.

$P_c$ is an assumed ratio of a PDSCH EPRE to a CSI-RS EPRE when a UE derives CSI feedback and takes a value of a [−8, 15] dB range as a 1-dB step size.

In this case, the PDSCH EPRE corresponds to symbols in which the ratio of the PDSCH EPRE and cell a specific RS EPRE is indicated as $\rho_A$.

A UE does not expect a configuration of a CSI-RS and a PMCH in the same subframe of a serving cell.

With respect to a frame structure type 2 serving cell and 4 CRS ports, a UE does not expect that it will receive a CSI-RS configuration index belonging to sets [20-31] for a normal CP case or sets [16-27] for an extended CP case.

A UE may assume that the CSI-RS antenna port of a CSI-RS resource configuration is QCL with respect to delay spread, Doppler spread, Doppler shift, average gain, and average delay.

A UE configured as the transmission mode 10 and the QCL type B may assume that the antenna ports 0 to 3, associated with qcl-CRS-Info-r11 corresponding to a CSI-RS resource configuration, and the antenna ports 15 to 30 corresponding to a CSI-RS resource configuration are QCL with respect to Doppler shift and Doppler spread.

A UE which has been configured as the transmission mode 10 and configured as a higher layer parameter eMIMO-Type and in which eMIMO-Type is set as "Class B" and the number of configured CSI resources is one greater than one CSI process and which has the QCL type B does not expect that it will receive a CSI-RS resource configuration for a CSI process having a different value of a higher layer parameter qcl-CRS-Info-r11.

A BL/CE UE configured as CEModeA or CEModeB does not expect that it will be configured as a non-zero transmission power CSI-RS.

Assumptions Independent of Physical Channel

A UE does not assume that two antenna ports are QCL, unless described otherwise.

A UE may assume that the antenna ports 0 to 3 of a serving cell are QCL with respect to delay spread, Doppler spread, Doppler shift, average gain, and average delay.

For the purpose of discovery signal-based measurement, a UE does not assume the presence of a different signal or physical channel other than a discovery signal.

If a UE supports discoverySignalsInDeactSCell-r12, the UE has been configured as discovery signal-based RRM measurement in a carrier frequency that may be applied to a secondary cell in the same carrier frequency, the secondary cell has been deactivated, and the UE has not been configured by a higher layer in order to receive an MBMS in the secondary cell, an activation command for a PSS, SSS, PBCH, CRS, PCFICH, PDSCH, PDCCH, EPDCCH, PHICH, DMRS and a CSI-RS other than discovery signal transmission is not transmitted by the secondary cell up to a subframe received with respect to the secondary cell.

In the above-described operation, for example, in the case of a UE configured as the QCL Type B, in order to receive help for the channel estimation of a DMRS transmitted along with a scheduled PDSCH, the UE is limited to use LSPs estimated from a specific QCLed CSI-RS resource indicated in corresponding scheduling DCI.

In the new RAT (NR) environment taken into consideration in this specification, however, an aperiodic CSI-RS transmission method in the aspect that a CSI-RS itself is transmitted only when it deviates from a conventional periodic form is taken into consideration. Accordingly, there is a problem in that RS density to be use as a QCL CSI-RS may be sufficiently insufficient compared to a conventional technology.

QCL Parameter

At least one of the followings may be defined/configured as QCL parameters taken into consideration in the NR environment:

Delay spread

Doppler spread

Doppler shift

Average gain

Average delay

Average angle (AA):

This may mean that, for example, an Rx beam direction (and/or Rx beam width/sweeping degree) when a transmission signal from other antenna port(s) is received based on an AA estimated from a specific antenna port(s) is configured to be the same or similar (in association with this) and reception processing is possible (meaning that reception performance when an operation is performed as described above is guaranteed to be a specific level or more) between antenna ports whose QCL is guaranteed in the AA viewpoint.

The AA may also be represented as a name, such as an "(almost) dominant arrival angle", for example.

As a result, if a specific dominant (arrival) angle S of a signal measured from a specific antenna port is present, a specific dominant (arrival) angle of a signal measured from another antenna port capable of QCL assumption with the specific dominant (arrival) angle S may have a meaning that it is "almost" similar to the S.

That is, if such a QCL assumption is possible, this means that a receiver can use/apply an AA, estimated from a specific indicated QCLed RS/SS, to reception processing "almost" without any change. Accordingly, there is an advantage in that the efficient implementation/operation of a receiver are made possible.

Angular Spread (AS):

QCL in an AS aspect between two antenna ports means that an AS estimated from one port may be derived or estimated or applied from an AS estimated from another port.

In this case, the AS may be separately defined for each specific dimension as an azimuth and/or a zenith AS or may be defined together. Furthermore, in the departure and/or arrival aspect, the AS may be defined separately or together.

This may mean that, for example, an Rx beam width/ sweeping degree (and/or Rx beam direction) when a transmission signal from other antenna port(s) is received based on an AS estimated from a specific antenna port(s) is configured to be the same or similar (in association with this) and reception processing is possible (meaning that reception performance when an operation is performed as described above is guaranteed to be a specific level or more) between antenna ports whose QCL is guaranteed in the AS viewpoint.

That is, if the AA has a characteristic meaning an average and the (most) effective/dominant beam direction, the AS may be interpreted as a parameter regarding that how much is the beam direction spread and received by a radiator distribution (based on/with reference to the AA).

Power Angle(-of-Arrival) Profile (PAP):

A QCL in the PAP viewpoint between two antenna ports may mean that a PAP estimated from one port may be derived (or estimated or applied, which are identically handled) from a PAP estimated from the other port. In this case, the PAPs may be defined for each specific dimension may be defined together as a PAP for an Azimuth and/or Zenith angle-domain. Furthermore, the PAPs may be defined separately or together in the departure and/or arrival viewpoint.

Furthermore, in the PAP viewpoint, the PAP may mean that a received beam width/sweeping degree (and/or a received beam direction) when a transmission signal from another antenna port(s) is to be received can be configured, received and processed equally or similarly (in relation to this), for example based on a PAP estimated from a specific antenna port(s) between antenna ports whose QCL is guaranteed. That is, the PAP may mean that reception performance in such an operation is guaranteed to a specific level or higher.

Partial QCL

A partial QCL may also be called a sub-QCL, fractional QCL, or quasi-sub-location (QSL).

For example, to assume (or configure or indicate) that the partial QCL of a signal and/or channel, transmitted by a specific antenna port group A, for a signal and or channel transmitted by a specific antenna port group B is established may mean that a corresponding QCL parameter and/or QCL property for an antenna port group A may be assumed (or applied or used) to be a sub-set of a corresponding QCL parameter and/or QCL property estimated from an antenna port group B.

Hierarchical Beam Management

In the case of the NR system, a beam acquisition process having multiple steps (i.e., hierarchical) may be considered for beam acquisition in an environment using multiple beams. In this case, the multiple step beam acquisition may mean that a BS and a UE perform connection setup using a wide beam of an SS block/measurement reference signal (MRS) in an initial access step and, after the connection is completed, the BS and the UE perform communication with the best quality using a narrow beam applied to a CSI-RS resource and/or a CSI-RS port index.

That is, in relation to the hierarchical beam acquisition, a method of indicating wide beam information through a QCL indication for an SS block when a CSI-RS for beam management is configured may be considered. Hereinafter, related contents are described along with FIGS. 7 and 8.

Figure 7:
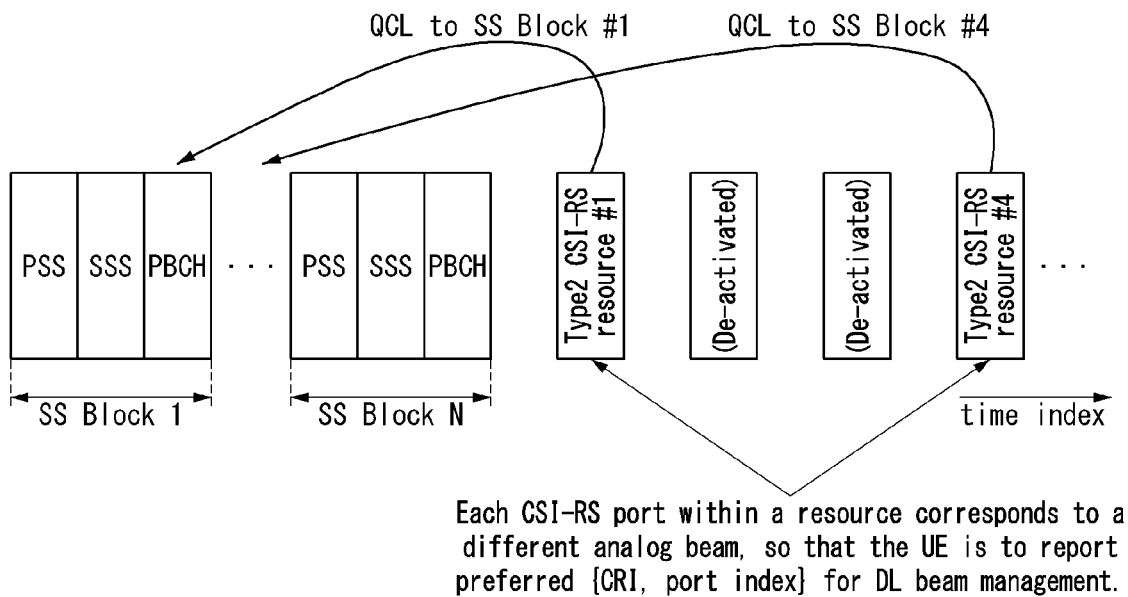
FIG. 7 illustrates a necessary QCL indication for Type 2 CSI-RS resources to which a method proposed in this specification may be applied.

FIG. 7 illustrates a necessary QCL indication for Type 2 CSI-RS resources to which a method proposed in this specification may be applied.

Figure 8:
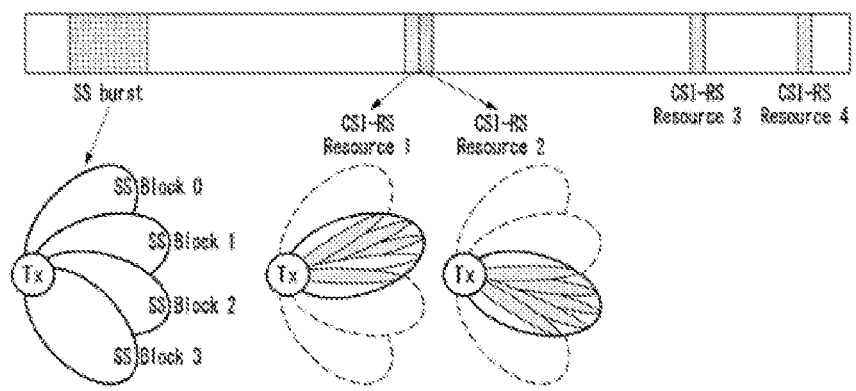
FIG. 8 illustrates a QCL relation between CSI-RS resources and SS blocks to which a method proposed in this specification may be applied.

Furthermore, FIG. 8 illustrates a QCL relation between CSI-RS resources and SS blocks to which a method proposed in this specification may be applied. An SS block beam-width (QCLed for a CSI-RS resource) transmitted as a system frame number (SFN) may be split by a plurality of transmission CSI-RS ports within a resource. In this case, each (i.e., split beam-width) may correspond to another analog beam by a gNB implementation. In this case, a QCL indication may include a cell/transmit point (TP) identifier associated with an SS block, and thus a beam management procedure may cover a multi-cell/TP scenarios in order to support at least efficient CoMP operation.

Detailed contents related to this are as follows.

In relation to a mechanism of a UE for providing an L1/L2 report based on SS block measurement for beam management, the channel and/or signal of an SS block for measurement may be considered. In particular, in the viewpoint of L3-RSRP, a unified format for the L1-RSRP measurement reporting of an SS block and a CSI-RS may be considered.

Furthermore, a maximum number of an SS block within an SS burst set for different frequency ranges may be considered. For example, in a frequency range of a maximum of 3 GHz, a maximum number of SS blocks within an SS burst set are [1, 2, 4]. Or, in a frequency range of 3 GHz to 6 GHz, a maximum number of SS blocks within an SS burst set are [4, 8]. Or, in a frequency range of 6 GHz to 52.6 GHz, a maximum number of SS blocks within an SS burst set are [64].

Beam Group Reporting

In the case of the NR system, in relation to multiple beam reportings, beam group reporting may be supported. In this case, a UE may indirectly transmit information for the Rx beam(s) of the UE through the beam group reporting in addition to information for the Tx beam(s) of a BS.

For example, if a UE reports information for a TRP Tx beam(s) which may be received using a selected UE Rx beam set(s), the UE may receive the BS beams of the same group at the same time. In this case, the BS may perform Tx beam switching without a QCL indication for Rx setting. For another example, if a UE reports information for a TRP Tx beam(s) for each UE antenna group, a group index may be considered as a panel (i.e., antenna panel) index of the UE. The UE cannot receive Tx beams within the same group at the same time.

Detailed contents related to this are as follows.

In the case of the NR system, two types of methods may be supported in relation to beam reporting. The first method is a method (hereinafter method 1) of reporting, by a UE, information for a TRP Tx beam(s) which may be received using a selected UE Rx beam set(s). In contrast, the second method is a method (hereinafter method 2) of reporting, by a UE, information for a TRP Tx beam(s) for each UE antenna group.

In relation to the method 1, an Rx beam set refers to a set of UE Rx beam sets used to receive a DL signal. For example, each of the Rx beams of a UE Rx beam set may correspond to a selected Rx beam in each panel. Furthermore, with respect to UEs having one or more UE Rx beam sets, a UE may report a TRP Tx beam(s), and may report the identifier of a UE Rx beam set associated for each reported Tx beam. Furthermore, different TRP Tx beams reported for the same Rx beam set may be received by a UE at the same time. Furthermore, different TRP Tx beams reported for different UE Rx beam sets may not be received by a UE at the same time.

In relation to the method 2, a UE antenna group denotes an Rx UE antenna panel or subarray. Furthermore, a UE may report a TRP Tx beam(s) and report the identifier of a UE antenna group associated for each reported Tx beam with respect to UEs having one or more UE antenna groups. Furthermore, different TRP Tx beams reported for different antenna groups may be received by a UE at the same time. Furthermore, different TRP Tx beams reported for the same UE antenna group may not be received by a UE at the same time.

Furthermore, in the case of the NR system, the following beam reporting in which L groups are considered may be supported. In this case, L is greater than or equal to 1, and each group denotes an Rx beam set (method 1) or a UE antenna group (method 2).

In relation to this, with respect to each group 1, a UE may report at least information indicating a group in the least case, measurement quantities for an $N_1$ beam(s), and information indicating an $N_1$ DL Tx beam(s) if possible. In this case, the measurement quantities may include reference signal received power (RSRP), reference signal received quality (RSRQ) and/or CSI reporting (if a CSI-RS for CSI acquisition is present). Furthermore, the information indicating an $N_1$ DL Tx beam(s) may include a CSI-RS resource ID, an antenna port index, a combination of an antenna port index and a time index, a sequence index, a beam selection rule for rank selection for MIMO transmission, etc.

Furthermore, such group-based beam reporting may be configured for each UE. Specifically, the group-based beam reporting may be turned off in a UE unit (e.g., if L=1 and $N_1$=1). In this case, if the group-based beam reporting is turned off, a group identifier may not be reported.

Furthermore, in the case of the NR system, the following beam grouping criteria may be considered. A different TRP Tx beam(s) reported for the same group may be received by a UE at the same time (A1) based on the method 1. Furthermore, a different TRP Tx beam(s) reported for different groups may be received by a UE at the same time (A2) based on the method 2. Furthermore, a different TRP Tx beam(s) reported for different groups cannot be received by a UE at the same time (C1 that may be considered along with A1). Furthermore, a different TRP Tx beam(s) reported for the same group cannot be received by a UE at the same time (C2 that may be considered along with A2).

Furthermore, in the case of the NR system, the following measurement quantity needs to be considered with respect to beam management through beam group reporting. For example, a maximum number of groups M supported in the specification, a maximum number of Tx beams N for each group supported in the specification, the number of groups L to be reported, the number of Tx beams Q for each group in reporting, etc. may be considered. In this case, L=1 and Q=1 may mean that reporting and indication overhead are not influenced.

Hereinafter, in this specification, a method of receiving, by a UE, at least one specific signal (e.g., SS block, CSI-RS, BRS or MRS) transmitted by a BS(s) and performing beam management is described in detail. In relation to the method, a method of reporting, by the UE, a measurement result (and/or information for one or more beams) by the at least one specific signal to the BS is described.

As described above, in the NR system, a hierarchical (e.g., 2-step) beam management procedure may be performed. Specifically, a method of determining, by a BS and a UE, a wide (or coarse) beam using an SS block and determining a narrow beam using a beam reference signal (BRS) (e.g., CSI-RS (for the use of beam management)) with respect to the determined wide beam may be considered. In this case, the UE needs to report (each of) a measured result using an SS block and a measurement result using a beam reference signal.

However, in the NR system, if information for a beam (or a beam pair) is reported through beam management, overhead (i.e., reporting overhead) may be great because each of a BS and a UE supports a plurality of beams. Hereinafter, in relation to the reporting procedure of a UE for beam management, such as that described above, detailed methods for reducing reporting overhead are described.

Furthermore, embodiments described hereinafter have been divided for convenience of description only. Some elements or characteristics of any embodiment may be included in another embodiment or may be substituted with elements or characteristics of another embodiment. For example, hereinafter, a method described in a first embodiment may be additionally applied t a method described in a second embodiment and vice versa.

First Embodiment—Method of Reducing Reporting Overhead by Restricting Cell and/or SS Block to be Used for Beam Management In the NR system, as described above, a method of performing beam management using an SS block and/or MRS for initial access and radio resource measurement (RRM) may be considered. In this case, the SS block includes a PSS, an SSS, and a PBCH, and may denote at least one of a PSS, an SSS, and a PBCH. Furthermore, for convenience of description, the method proposed in this specification is described based on a method using an SS block, but may also be identically applied to a method using an MRS.

In this case, for beam management, an L1/L2 report for SS block measurement may be considered. Beam direction information and/or RSRP (e.g., L1-RSRP) may be considered as reporting information. In this case, if a multi-cell/transmit point (TP) is considered, a method using a cell ID indicator and the SS block indicator of a corresponding cell ID as the beam direction information may be considered. That is, in order to report a beam direction, a UE may report, to a BS, the identifier of a specific cell and the index of a specific SS block of SS blocks supported in a corresponding specific cell together.

However, in the NR system, about 1000 (e.g., 1008) cell IDs and a maximum of 64 SS blocks in each cell may be considered. In the case of a reporting method using a cell ID and the index of an SS block, there is a problem in that reporting overhead increases. Specifically, if a UE reports (e.g., L1/L2 report), to a BS, beam direction information using a cell ID and an SS block index, a total of 16 bits may be necessary.

Accordingly, in order to reduce a payload size and/or the measurement complexity of a UE, if an SS block for beam management is reported, a method of restricting (or recommending) a cell ID to be measured and/or the index of an SS block may be considered. In other words, in a beam management procedure, a method of reducing measurement overhead and/or reporting overhead by restricting a cell on which a UE will perform measurement and an SS block may be considered. Hereinafter, a method of limiting a cell ID (hereinafter method 1) and a method of limiting an SS block (hereinafter method 2) are described specifically.

(Method 1: Method of Limiting Cell ID)

First, a method of transmitting, by a BS, a (specific) neighbor cell ID list to a UE for the measurement and/or reporting of an SS block for beam management may be considered. In this case, the neighbor cell ID list may be transmitted through higher layer signaling (e.g., RRC message or MAC-CE).

In this case, the neighbor cell ID list may include the identifier(s) of a cell(s) to be measured by a UE for beam management. In this case, the identifiers included in the neighbor cell ID list may be configured as one or more groups depending on a specific condition or may be classified according to a pre-configured rule. That is, a UE that has received the neighbor cell ID list may be configured to perform measurement for beam management on only an SS block(s) transmitted by a cell corresponding to the identifier (s) included in the list.

In this case, the neighbor cell ID list may be designated (or configured) separately from a neighbor cell ID list for RRM measurement. Furthermore, in a specific situation, a method of performing measurement by overriding a cell ID list with a neighbor cell ID list for RRM management may also be considered. Alternatively, a method of providing, by a BS, one list (i.e., unified list or single list) for the purpose of beam management and RRM measurement to a UE may be considered.

As described above, for a multi-cell/TP operation, a neighbor cell ID list for beam management may be indicated (or configured). Furthermore, such a multi-cell/TP operation (e.g., coordinated multi-point (CoMP) operation) may be performed on a relatively smaller number of cells (e.g., 3 cells) than the number of cells for the subject of RRM measurement. In this case, in the above-described reporting, a cell ID indicator (i.e., cell indicator) (or cell ID indication field) may be set as 1 to 2 bits, and thus reporting overhead can be lowered.

In other words, a BS may indicate (or limit) the SS block(s) of a specific cell(s) through a neighbor cell ID list so that a UE performs measurement and/or reporting. Such a method may be efficient in terms of the measurement complexity of a UE in addition to a reporting overhead aspect.

Furthermore, a neighbor cell ID list may be modified (or updated) through higher layer signaling (e.g., RRC message or MAC-CE) depending on the feedback of SS block measurement by a UE and/or BS scheduling.

Furthermore, a configuration for a neighbor cell ID list may be included in a CoMP configuration. Alternatively, a configuration for a neighbor cell ID list may be performed in a form, such as an SS block for beam management in resource setting. Furthermore, if a multi-cell/TP operation (e.g., CoMP operation) is not necessary, reporting using an SS block for beam management (i.e., SS block reporting) may be limited (or restricted) to an SS block(s) for a serving cell (i.e., SS block indicator(s)).

(Method 2: Method of Limiting SS Block)

A method of limiting (or recommending or setting), by a BS, SS blocks to a specific subset(s) in order to restrict measurement and/or reporting for SS blocks may be considered. In this case, the SS blocks may be SS blocks corresponding to each cell ID or virtual cell ID (VCID) included in the neighbor cell ID list described in the method 1.

Specifically, in order to reduce the payload size of an SS block indicator (or SS block indication field) corresponding to a specific cell ID in addition to the cell indicator in the method 1, a UE may be configured (or indicated) to perform measurement and/or reporting only a specific SS block subset(s) only. In this case, the specific SS block subset may be configured (or indicated) through higher layer signaling (e.g., RRC signaling or MAC-CE) related to an SS block.

Furthermore, a UE may be configured to perform measurement and/or reporting on some groups or a specific group only through the grouping of the beams of an SS block based on an indication or a pre-defined method. For example, a method of designating an SS burst as one group (i.e., configuring groups in an SS burst unit) and limiting a UE so that the UE performs measurement and/or reporting on only some or one SS burst may be considered.

In this case, through the method(s), the payload size of an SS block indicator (or SS block indication field) can be reduced, and a UE may be configured to perform measurement in a specific (or some) direction of a specific (or indicated) cell/TP(s). Accordingly, a load balancing effect in multiple cells/TPs can be obtained.

Furthermore, the above-described SS block restriction (i.e., SS block subset restriction) may be changed (or updated) through higher layer signaling (e.g., RRC message or MAC-CE) depending on the feedback of SS block measurement by a UE and/or BS scheduling. That is, the UE may receive (or indicated), from a BE, information indicating that which SS block burst, SS block group or SS block subset(s) of which cell is the subject of a beam management procedure. In this case, the information may be transmitted (or configured) or changed through RRC or MAC.

Furthermore, the indication (or configuration) method of restricting a cell ID and/or SS block (i.e., SS block index) may be identically applied to a configuration (or indication) method for a quasi co-location (QCL) indication between a CSI-RS and an SS block.

Specifically, as described in the hierarchical beam management content, for a beam acquisition procedure having multiple steps, spatial QCL with an SS block may be indicated (or configured) for a CSI-RS resource. In this case, the indication (i.e., SS block indication) for the SS block QCLed with the corresponding CSI-RS resource may be configured (or indicated) using a cell ID and the SS block index of a corresponding cell. In this case, in relation to the SS block indication, a method of limiting the cell ID and/or the SS block may be identically applied. Accordingly, there is an effect in that the number of bits for the configuration of the QCLed SS block indication can be reduced.

Furthermore, for reporting (e.g., PUCCH reporting or PUSCH reporting) related to information for the SS block, the following two types of encoding methods (or encoding orders) may be considered. In this case, the two types of encoding methods may be configured by considering that the number of SS blocks indicated (or configured) in each cell ID (or VCID) may be different.

First, an encoding method of reporting an SS block indicator (or SS block indication field) may be considered by considering a maximum number of SS blocks of configured cell IDs (or VCIDs). The corresponding method may mean a method of reporting an SS block indicator based on a maximum number of SS blocks among the number of SS blocks configured for each cell ID in a neighbor cell ID list. For example, if 16 SS blocks are configured (or indicated) in a first cell ID (e.g., VCID #1) and 4 SS blocks are configured in a second cell ID (e.g., VCID #2), the number of bits reported by a UE using the corresponding method may be the same as Table 6.

TABLE 6

| VCID #1 | SS block index of VCID #1 | VCID #2 | SS block index of VCID #2 |
|---------|---------------------------|---------|---------------------------|
| 2 bits  | 4 bits                    | 2 bits  | 4 bits                    |

Referring to Table 6, an SS block indicator is set to 4 bits because a maximum of 16 SS blocks are configured for the first cell ID and the second cell ID.

In contrast, an encoding method of reporting an SS block indicator (or SS block indication field) by considering the number of SS blocks configured (or indicated) in each cell ID (or VCID) may be considered. The corresponding method may mean a method of differently setting the payload size (i.e., number of bits) of an SS block indicator for each cell ID based on the number of SS blocks configured in each cell ID. For example, if 16 SS blocks are configured (or indicated) in a first cell ID (e.g., VCID #1) and 4 SS blocks are configured in a second cell ID (e.g., VCID #2), the number of bits reported by a UE using the corresponding method is the same as Table 7.

TABLE 7

| VCID #1 | SS block index of VCID #1 | VCID #2 | SS block index of VCID #2 |
|---------|---------------------------|---------|---------------------------|
| 2 bits  | 4 bits                    | 2 bits  | 2 bits                    |

Referring to Table 7, the SS block indicator of the first cell ID is set to 4 bits and the SS block indicator of the second cell ID is set to 2 bits because the 16 SS blocks are configured in the first cell ID and the 4 SS blocks are configured in the second cell ID.

The second method have advantages in that a UE can report an SS block indicator using a smaller number of bits and thus more robust encoding can be perform. Furthermore, the corresponding method also has an advantage in that the payload size of an SS block indicator can be previously aware because a cell ID (e.g., VCID) is first decoded.

The above-described encoding methods may be previously configured (or indicated) through higher layer signaling, etc.

Second Embodiment—Method of Reducing Reporting Overhead in Relation to Beam Group Reporting Furthermore, in the NR system, as described above, multiple beam reportings for reporting in a beam group unit may be considered. In this case, a UE needs to report a beam group index(s), a beam index (e.g., Tx beam index) and/or a measurement quantity corresponding to each beam index. Accordingly, a payload size for the reporting may be set to be very large.

In this case, the beam index may be represented as a CSI-RS resource ID, the port index of a corresponding CSI-RS resource ID, an SS block index and/or a DMRS port index. Furthermore, the measurement quantities may be represented as reference signal received power (RSRP), reference signal received quality (RSRQ) and/or a channel quality indicator (CQI) (for a CSI-RS). Hereinafter, in this specification, a case where a reported measurement quantity is RSRP is assumed, for convenience of description.

As described in the beam group reporting part, in the NR system, a maximum number of beam groups (M) and a maximum number of beams (N) of each group are set. In this case, a BS may indicate (or configure) a criterion for a beam group and/or the number of beam groups (L) to be reported for beam group reporting and the number of beams (Q) to be reported per beam group by considering a UE capability and/or a location of the UE within a cell.

In this case, the UE capability may include the number of UE panels, the number of UE TXRUs and/or the number of UE Rx beams. Furthermore, in relation to a location of a UE within a cell, a UE located close to a BS may be configured to report more Tx beam(s) for spatial multiplexing (by considering a less scatter channel environment).

For example, if a BS indicates (or configures) L=2 (i.e., 2 beam groups reportings) and Q=4 (i.e., 4 beams reporting per beam group) with respect to a UE, the beam group reporting may be performed like Table 8.

TABLE 8

| Beam group index (BGI) | Beam index (BI) | RSRP |
|---|---|---|
| #1 | Best BI in group #1 | RSRP_1 of Best BI |
|  | $2_{nd}$ Best BI in group #1 | RSRP_2 of $2^{nd}$ Best BI |
|  | $3_{rd}$ Best BI in group #1 | RSRP_3 of $3_{rd}$ Best BI |
|  | $4_{th}$ Best BI in group #1 | RSRP_4 of $4_{th}$ Best BI |
| #3 | Best BI in group #3 | RSRP_1 of Best BI |
|  | $2^{nd}$ Best BI in group #3 | RSRP_2 of $2^{nd}$ Best BI |
|  | $3_{rd}$ Best BI in group #3 | RSRP_3 of $3_{rd}$ Best BI |
|  | $4_{th}$ Best BI in group #3 | RSRP_4 of $4_{th}$ Best BI |

Referring to Table 8, a UE performs reporting on a first beam group (i.e., beam group index #1) and a third beam group (i.e., beam group index #3), and reports, to a BS, 4 best beams (i.e., Tx beams) for each beam group.

In the NR system, a case where M=4 (i.e., 4 beam groups) and N=64 (i.e., 64 beams for each beam group) and $\log_2(K)$ bits are reported in relation to K states for RSRP reporting may be considered. In this case, a payload size may be set as $\log_2(M)*L$ bits for a beam group index, $\log_2(N)*L*Q$ for a beam index, and $\log_2(K)*L*Q$ bits for RSRP. Furthermore, in relation to beam group reporting, a case where a BS previously indicates (or configures) that a UE should sequentially transmit RSRP in order of high beam reporting priority within each beam group is assumed.

For example, if M=4, N=64, Q=4, and K=5, a total of 92 bits are necessary for beam group reporting, a payload size is set to be very great. Furthermore, the beam group reporting may be transmitted (or forwarded) through uplink control information (UCI) or a MAC-CE. If the beam group reporting is transmitted through a MAC-CE, a payload size may be flexibly set.

Hereinafter, the second embodiment of this specification proposes a method for reducing a reporting payload size in relation to beam group reporting.

First, a method of adding, by a UE, the beam index of a corresponding group (i.e., beam group) and/or information (or indicator) for whether to report RSRP for the corresponding beam index to reporting information and transmitting the reporting information to a BS may be considered.

Specifically, a UE may determine whether RSRP of a corresponding specific beam meets a pre-configured condition with respect to a specific beam that needs to be reported for a beam group reporting parameter (i.e., L, Q) indicated (or configured) by a BS, and may transmit, to the BS, an indicator indicating whether to perform reporting on the corresponding specific beam. In this case, the indicator may be transmitted in a part (or next field, next subframe or next slot) next a beam group index and/or a pre-indicated (or configured) part (e.g., subframe or slot having a specific time offset in a beam group index. Through such a method, a BS can be aware of whether a corresponding beam index included in a corresponding group has been transmitted (or reported).

In relation to whether to report a beam index, a BS may indicate (or set) a specific threshold (e.g., RSRP threshold a($RSRP_{th,\ a}$)) for a reporting beam. A UE may omit reporting for a beam index that meets a specific condition configured using the specific threshold. For example, if RSRP of a beam index is smaller than a value obtained by subtracting the specific threshold from RSRP of the best beam index (i.e., RSRP of a beam index (BI)<RSRP of best BI–$RSRP_{th,\ a}$), the UE may perform reporting from which information of a corresponding beam index has been omitted. In this case, the RSRP of the best beam index may be set as an RSRP value for the best beam index within one beam group or an RSRP value for the best beam index within all beam groups.

If a BS indicates (or sets) that a UE should report 4 beams for each beam group, the reporting states of beam indices (i.e., information for whether to report beam indices) may be represented like Table 9.

TABLE 9

| Beam group index (BGI) | Flag in best Beam Index (BI) | Flag in $2^{nd}$ BI | $3_{rd}$ Best BI | $4_{th}$ Best BI | BI reporting states |
|---|---|---|---|---|---|
| #1 | On | On | On | On | 00 |
|  | On | On | On | Off | 01 |
|  | On | On | Off | Off | 10 |
|  | On | Off | Off | Off | 11 |

As in Table 9, assuming that a UE sequentially reports RSRP in order of higher RSRP with respect to each beam group (e.g., beam group index #1), an indicator for whether to report a beam index may indicate (or notify) the number of transmission of beam indices using log 2(Q) bits (in this case, Q is the number of beams to be reported for each group indicated by a BS. For example, if a beam index (BI) reporting state is "00", the UE reports (or transmits) 4 beam indices. In contrast, if the BI reporting state is "11", the UE reports only the best BI. Furthermore, if a beam index to be reported within a corresponding beam group (i.e., a beam index that meets a specific condition) is not present, the reporting of the corresponding group may be omitted.

Furthermore, in relation to whether to report RSRP, if RSRP corresponding to a specific beam index has the best RSRP (e.g., the RSRP of the best beam index) and a size within a given range, a UE may omit RSRP reporting of the corresponding beam index. In this case, what the RSRP has a size within a given range may mean that RSRP corresponding to a specific beam index meets a specific condition configured by a BS using a preset specific threshold (e.g., RSRP threshold b ($RSRP_{th,\ b}$)).

For example, if RSRP of a beam index is greater than a value obtained by subtracting the specific threshold from the RSRP of the best beam index (i.e., RSRP of a beam index (BI)>RSRP of best BI–$RSRP_{th,\ b}$), a UE may perform reporting from which RSRP information of the corresponding beam index has been omitted.

In this case, the UE may notify the BS of whether to transmit RSRP using an indicator($\log_2$ (#of best BIs)) for whether to transmit RSRP. For example, in Table 9, if the BI reporting state is "00", a UE transmits 4 beam indices. In this case, transmission states (i.e., on/off states) for RSRP of $2^{nd}$ to $4^{th}$ BIs may be four cases.

That is, a corresponding UE may perform the reporting of RSRP corresponding to the $2^{nd}$ to $4^{th}$ BIs based on the four states (i.e., [on, on, on], [off, on, on], [off, off, on], and [off, off, off]), and may transmit (or notify) whether to report RSRP to the BS using 2-bit information. In other words, the UE may transmit information for a transmission RSRP number corresponding to a beam index reporting state (i.e., a RSRP reporting number corresponding to a corresponding beam index reporting state) through an indicator of $\log_2$ (#of best BIs)) bits.

Accordingly, a beam index for each group and/or an indicator for whether to report RSRP of a corresponding beam index may be configured (or represented) as $\log_2(L)$ bits for a beam group index, $\log_2(Q)$ bits for beam index reporting, and $\log_2$ (#of best BIs) bits for RSRP reporting. Through such a method, an effect in that feedback overhead (i.e., reporting overhead) for the beam group reporting of a UE can be reduced.

Furthermore, a beam group index and beam index reporting indicator information of the corresponding beam group index (i.e., indicator for whether to report a beam index) may be more important than other reporting information. Accordingly, a method of joint-encoding a beam group index and beam index reporting indicator information of the corresponding beam group index may be considered. Furthermore, if the decoding of an RSRP value reported for a corresponding beam index fails, RSRP of the corresponding beam index may be assumed (or presumed) to be the recent RSRP of a corresponding beam index that has been previously reported.

Furthermore, in various embodiments of the present disclosure, in relation to the beam group reporting, if RSRP corresponding to a beam index that needs to be reported meets a condition pre-configured (or indicated) by a BS, a UE may transmit a beam index and/or whether to report RSRP corresponding to the corresponding beam index using flag information (i.e., 1-bit information), respectively. For example, the UE may transmit flag information for whether to report a beam index ahead of beam index information (or previous field, previous subframe or previous slot) and/or may transmit flag information for whether to report RSRP corresponding to the corresponding beam index ahead of RSRP information.

Specifically, a UE may determine whether RSRP of a corresponding specific beam meets a pre-configured condition with respect to the specific beam that needs to be reported for a beam group reporting parameter (i.e., L, Q) indicated (or configured) by a BS, and may transmit flag information ahead of beam index information and/or RSRP information based on a result of the determination. There is an effect in that reporting overhead is reduced because a UE performs reporting by omitting corresponding information (i.e., beam index information and/or RSRP information) through such a method.

In this case, in relation to whether to report a beam index, the BS may indicate (or set) a specific threshold (e.g., RSRP threshold a($RSRP_{th, a}$)) for a reported beam. The UE may transmit a beam index to meet a specific condition, configured using the specific threshold, through flag information, and may omit the reporting of the corresponding beam index.

For example, if RSRP of a beam index is smaller than a value obtained by subtracting the specific threshold from RSRP of the best beam index (i.e., RSRP of a beam index (BI)<RSRP of best BI−$RSRP_{th, a}$), a UE may transmit flag information for the corresponding beam index and omit the reporting of the corresponding beam index. As described above, the RSRP of the best beam index may be set as an RSRP value for the best beam index within one beam group or an RSRP value for the best beam index within all beam groups.

Furthermore, in relation to whether to report RSRP, if RSRP corresponding to a specific beam index has the best RSRP (e.g., RSRP of the best beam index) and a size within a given range, a UE may transmit corresponding RSRP information as flag information (instead), and may omit the reporting of the corresponding RSRP information. In this case, what the RSRP has a size within a given range may mean that RSRP corresponding to a specific beam index meets a specific condition configured by a BS using a preset specific threshold (e.g., RSRP threshold b($RSRP_{th, b}$)).

For example, if RSRP of a beam index is greater than a value obtained by subtracting the specific threshold from RSRP of the best beam index (i.e., RSRP of a beam index (BI)>RSRP of best BI−$RSRP_{th, b}$), a UE may transmit corresponding RSRP information as flag information (instead) and omit the reporting of the corresponding RSRP information.

For example, if the second best beam index ($2^{nd}$ best BI) of a first beam group (i.e., beam group index #1) meets a specific condition (e.g., the above-described beam index-related condition) indicated by a BS and RSRP of the second best beam index of a third beam group (i.e., beam group index #3) meets a specific condition (e.g., the above-described RSRP-related condition) indicated by the BS, beam group reporting may be performed like Table 10.

TABLE 10

| Beam group index (BGI) | Beam index (BI) | RSRP |
|---|---|---|
| #1 | Flag 0 (on) + Best BI in group #1 | RSRP_1 of Best BI |
|  | Flag 1 (off) | none |
|  | none | none |
|  | none | none |
| #3 | Flag 0 (on) + Best BI in group #3 | RSRP_1 of Best BI |
|  | Flag 0 (on) + $2^{nd}$ Best BI in group #3 | Flag 1 (off) |
|  | Flag 0 (on) + $3^{rd}$ Best BI in group #3 | Flag 0 (on) + RSRP_3 of Best BI |
|  | Flag 1 (off) + $4^{th}$ Best BI in group #3 | none |

Referring to Table 10, the reporting of the second best beam index ($2^{nd}$ best BI) of the first beam group (i.e., beam group index #1) may be substituted with flag information (Flag 1 (off)), and RSRP information of the second best beam index of the third beam group (i.e., beam group index #3) may be substituted with flag information (Flag 1 (off)).

As described above, if a corresponding beam index meets a condition indicated by a BS, reporting overhead of a UE can be reduced because the UE additionally transmits flag information for whether to transmit a beam index and/or RSRP. In this case, the BS may determine whether flag information is present ahead of beam index information and/or RSRP information with respect to beam reporting information within a group. If the flag information is present, the BS may recognize that corresponding information (i.e., beam index information and/or RSRP information) meets a pre-indicated condition and has been omitted from the reporting of the UE.

Furthermore, a configuration for whether to apply the above-described flag information may be previously indicated (or configured) by a BS. For example, the BS may configure the flag information so that it is transmitted ahead of beam group reporting information. In this case, a UE may configure (or transmit) reporting information in order of the beam group index, the flag information (i.e., 1-bit information of on/off) for whether to apply, and the beam group reporting information.

Figure 9:
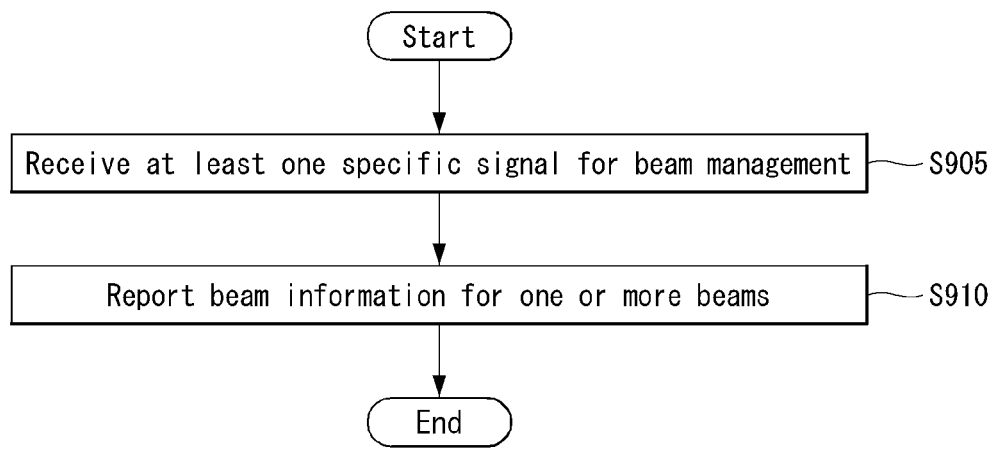
FIG. 9 illustrates an example of an operational flowchart in which a UE reports beam-related information in a wireless communication system to which a method proposed in this specification may be applied.

FIG. 9 illustrates an example of an operational flowchart in which a UE reports beam-related information in a wireless communication system to which a method proposed in this specification may be applied. FIG. 9 is merely for convenience of description and does not restrict the scope of the present disclosure.

Referring to FIG. 9, a case where the UE performs beam group reporting using a pre-configured signal for beam management is assumed.

At step S905, the UE receives at least one specific signal for beam management from a BS. In this case, the at least one specific signal may include at least one of a channel state information-reference signal, a beam reference signal, a measurement reference signal, or synchronization signal block, as described above.

Thereafter, at step S910, the UE reports, to the BS, beam information for one or more beams based on a measurement result by the at least one specific signal. In this case, the one or more beams are configured with one or more beam groups. Furthermore, the beam information includes information for whether to report information related to at least one beam included in each beam group (e.g., indicator for whether to report a beam index or RSRP of the corresponding beam index in the second embodiment).

In this case, the information related to at least one beam may include at least one of the beam index of the at least one beam or received power information corresponding to the at least one beam as described above.

Furthermore, the UE may further receive, from the BS, configuration information indicating the number of one or more beam groups (e.g., L) reported by the UE and the number of at least one beam (e.g., Q) included in each beam group.

Furthermore, the information for whether to report the information may include at least one of first bitmap information (e.g., $\log_2(Q)$ bit information in the second embodiment) configured based on the number of one or more beam groups or second bitmap information (e.g., $\log_2(\text{\#of best BIs})$ bits information in the second embodiment) configured based on the number of at least one beam.

Furthermore, as described above, whether to report the information may be determined based on a specific condition configured based on a preset specific threshold (e.g., $RSRP_{th,\ a}$, $RSRP_{th,\ b}$) and received power information corresponding to the best beam (e.g., RSRP of best BI). In this case, if received power information corresponding to a specific beam meets the specific condition, the beam index of the specific beam may not be included in the beam information. That is, in this case, the UE may not report the beam index of the specific beam.

Furthermore, if received power information corresponding to a specific beam meets the specific condition, the received power information corresponding to the specific beam may not be included in the beam information. That is, in this case, the UE may not report the received power information corresponding to the specific beam.

In this case, a specific condition for whether to report a beam index and a specific condition for whether to report received power information may be differently configured.

Furthermore, the information for whether to report the beam index of the at least one beam may be joint-encoded with the index of a beam group including the at least one beam as described above.

Furthermore, the information for whether to report the information may include at least one of first flag information for whether to report a beam index or second flag information for whether to report received power information for each beam, as in Table 10.

Furthermore, as described in the first embodiment, the UE may receive, from the BS, a pre-configured cell ID list (e.g., neighbor cell ID list) for the beam management. In this case, the cell ID list may be received through higher layer signaling (e.g., RRC message or MAC-CE).

Thereafter, the UE may receive one or more synchronization signal blocks from at least one BS corresponding to at least one cell ID included in the cell ID list. In this case, the one or more synchronization signal blocks may be included in one or more synchronization signal (SS) bursts pre-configured by the BS (i.e., serving BS) among a plurality of SS bursts transmitted by the at least one BS. Thereafter, the UE may report, to the BS, a measurement result by the received one or more synchronization signal blocks.

Figure 10:
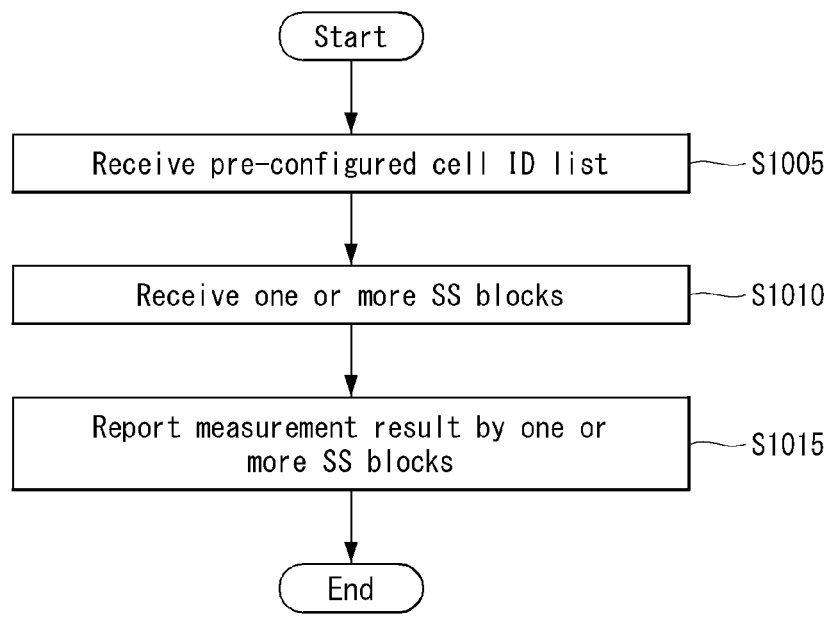
FIG. 10 illustrates another example of an operational flowchart in which a UE reports beam-related information in a wireless communication system to which a method proposed in this specification may be applied.

FIG. 10 illustrates another example of an operational flowchart in which a UE reports beam-related information in a wireless communication system to which a method proposed in this specification may be applied. FIG. 10 is merely for convenience of description and does not restrict the scope of the present disclosure.

At step S1005, the UE receives a cell identifier (ID) list pre-configured for beam management from a serving base station. For example, as in the first embodiment, the UE may receive configuration information indicating a pre-configured neighbor cell ID list. In this case, the UE may perform a beam management procedure on only cells included in the neighbor cell ID list.

Thereafter, at step S1010, the UE receives one or more synchronization signal blocks from at least one neighbor base station corresponding to at least one cell ID included in the cell ID list and from the serving base station. In this case, the one or more synchronization signal blocks may be used for the beam management procedure.

Thereafter, at step S1015, the UE reports, to the serving base station, a measurement result by the received one or more synchronization signal blocks. In this case, the measurement result includes at least one of cell ID information, SS block index information, or received power information (e.g., L1-RSRP).

General Apparatus to which the Present Invention May be Applied

Figure 11:
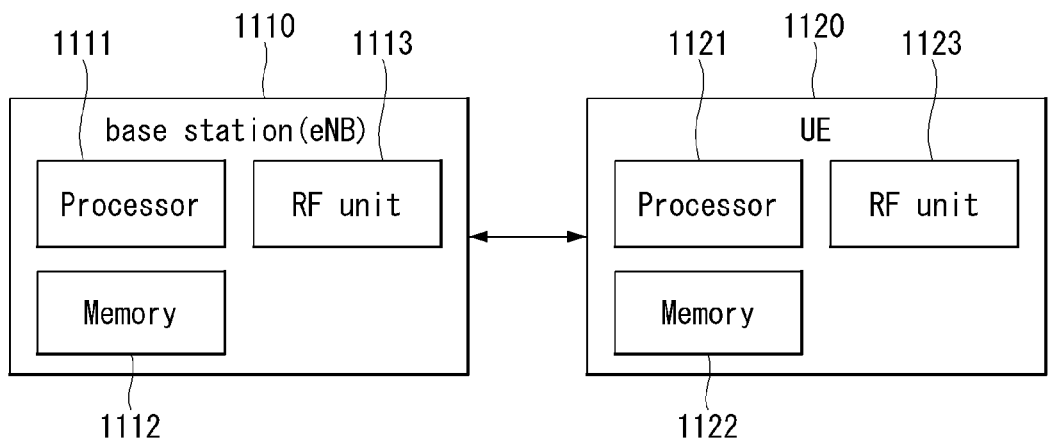
FIG. 11 illustrates a block diagram of a wireless communication apparatus according to an embodiment of the present disclosure.

FIG. 11 illustrates a block diagram of a wireless communication device according to an embodiment of the present invention.

Referring to FIG. 11, a wireless communication system includes an eNB (or network) 1110 and a UE 1120.

The eNB 1110 includes a processor 1111, a memory 1112, and a communication module 1113.

The processor 1111 implements the functions, processes and/or methods proposed in FIGS. 1 to 10. The layers of a wired/wireless interface protocol may be implemented by the processor 1111. The memory 1112 is connected to the processor 1111 and stores various types of information for driving the processor 1111. The communication module 1113 is connected to the processor 1111 and transmits and/or receives wired/wireless signals.

The communication module 1113 may include a radio frequency (RF) unit for transmitting/receiving a radio signal.

The UE 1120 includes a processor 1121, a memory 1122, and a communication module (or the RF unit) 1123. The processor 1121 implements the functions, processes and/or methods proposed in FIGS. 1 to 10. The layers of a radio interface protocol may be implemented by the processor 1121. The memory 1122 is connected to the processor 1121 and stores various types of information for driving the processor 1121. The communication module 1123 is connected to the processor 1121 and transmits and/or receives a radio signal.

The memory 1112, 1122 may be positioned inside or outside the processor 1111, 1121 and may be connected to the processor 1111, 1121 by various well-known means.

Furthermore, the eNB 1110 and/or the UE 1120 may have a single antenna or multiple antennas.

Figure 12:
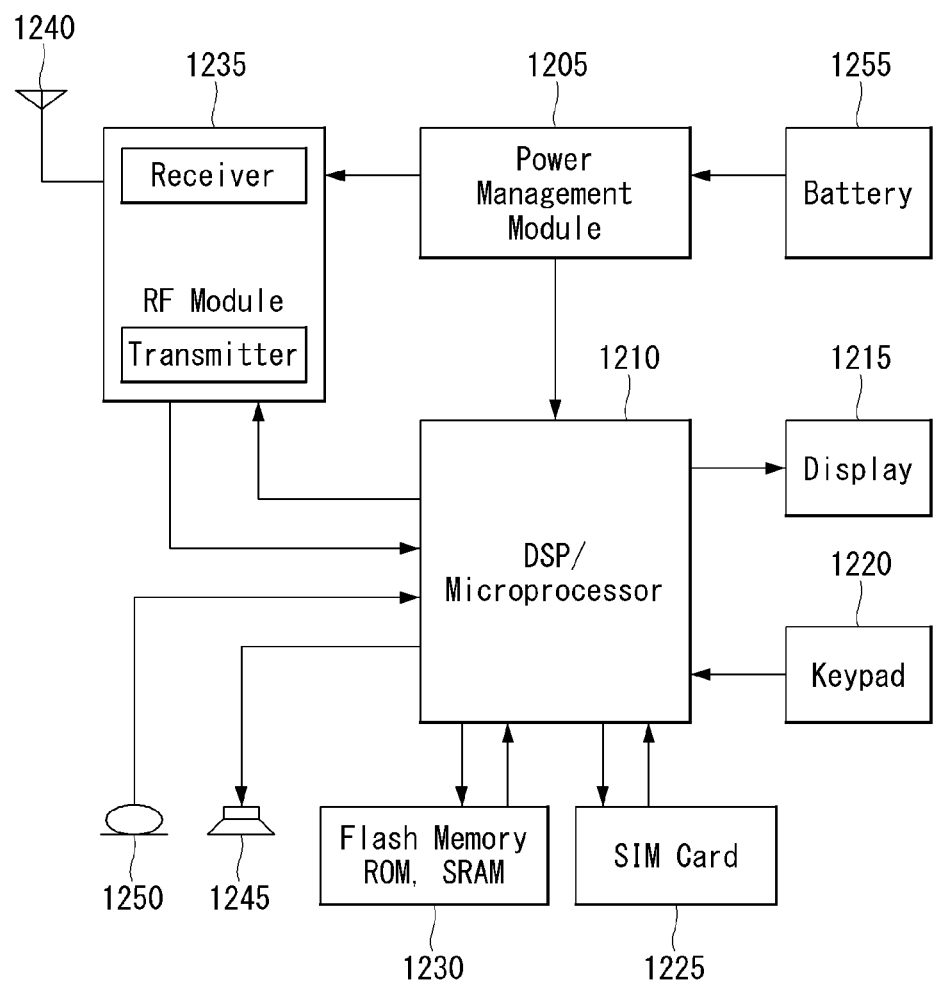
FIG. 12 illustrates a block diagram of a communication apparatus according to an embodiment of the present disclosure.

FIG. 12 illustrates a block diagram of a communication device according to an embodiment of the present invention.

Particularly, FIG. 12 is a diagram illustrating the UE of FIG. 11 more specifically.

Referring to FIG. 12, the UE may include a processor (or digital signal processor (DSP)) 1210, an RF module (or RF unit) 1235, a power management module 1205, an antenna 1240, a battery 1255, a display 1215, a keypad 1220, a memory 1230, a subscriber identification module (SIM) card 1225 (this element is optional), a speaker 1245, and a microphone 1250. The UE may further include a single antenna or multiple antennas.

The processor 1210 implements the function, process and/or method proposed in FIGS. 1 to 10. The layers of a radio interface protocol may be implemented by the processor 1210.

The memory 1230 is connected to the processor 1210, and stores information related to the operation of the processor 1210. The memory 1230 may be positioned inside or outside the processor 1210 and may be connected to the processor 1210 by various well-known means.

A user inputs command information, such as a telephone number, by pressing (or touching) a button of the keypad 1220 or through voice activation using the microphone 1250, for example. The processor 1210 receives such command information and performs processing so that a proper function, such as making a phone call to the telephone number, is performed. Operational data may be extracted from the SIM card 1225 or the memory 1230. Furthermore, the processor 1210 may recognize and display command information or driving information on the display 1215, for convenience sake.

The RF module 1235 is connected to the processor 1210 and transmits and/or receives RF signals. The processor 1410 delivers command information to the RF module 1235 so that the RF module 1235 transmits a radio signal that forms voice communication data, for example, in order to initiate communication. The RF module 1235 includes a receiver and a transmitter in order to receive and transmit radio signals. The antenna 1240 functions to transmit and receive radio signals. When a radio signal is received, the RF module 1235 delivers the radio signal so that it is processed by the processor 1210, and may convert the signal into a baseband. The processed signal may be converted into audible or readable information output through the speaker 1245.

The aforementioned embodiments have been achieved by combining the elements and characteristics of the present invention in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The signal transmission and reception methods using a beam in a wireless communication system of the present invention have been illustrated based on an example in which it is applied to the 3GPP LTE/LTE-A system and 5G, but may be applied to various wireless communication systems in addition to the 3GPP LTE/LTE-A system and 5G.

What is claimed is:

1. A method of reporting, by a user equipment, beam-related information in a wireless communication system, the method comprising:
   receiving, from a base station, at least one specific signal for beam management,
   reporting, to the base station, beam information for one or more beams based on a measurement result by the at least one specific signal,
   wherein the one or more beams are configured as one or more beam groups, and
   wherein the beam information comprises information for whether to report information related to at least one beam included in each beam group,
   receiving, from the base station, a cell identifier list pre-configured to the beam management,
   receiving one or more synchronization signal blocks from at least one base station corresponding to at least one cell identifier included in the cell identifier list, and
   reporting, to the base station, a measurement result by the received one or more synchronization signal blocks.

2. The method of claim 1,
   wherein the information related to the at least one beam comprises at least one of a beam index of the at least one beam or received power information corresponding to the at least one beam.

3. The method of claim 2, further comprising:
   receiving, from the base station, configuration information for the number of the one or more beam groups and the number of the at least one beam included in each beam group reported by the user equipment.

4. The method of claim 3,
wherein the information for whether to report comprises at least one of first bitmap information configured based on the number of one or more beam groups or second bitmap information configured based on the number of at least one beam.

5. The method of claim 2,
wherein whether to report is determined based on a specific condition configured based on a preset specific threshold and received power information corresponding to a best beam.

6. The method of claim 5,
wherein if received power information corresponding to a specific beam meets the specific condition, a beam index of the specific beam is not included in the beam information.

7. The method of claim 5,
wherein if received power information corresponding to a specific beam meets the specific condition, the received power information corresponding to the specific beam is not included in the beam information.

8. The method of claim 2,
wherein information for whether to report a beam index of the at least one beam is joint-encoded with an index of a beam group including the at least one beam.

9. The method of claim 1,
wherein the information for whether to report comprises at least one of first flag information for whether to report a beam index or second flag information for whether to report received power information, for each beam.

10. The method of claim 1,
wherein the one or more synchronization signal blocks are included in one or more synchronization signal bursts pre-configured by the base station, among a plurality of synchronization signal bursts transmitted by the at least one base station.

11. The method of claim 1,
wherein the pre-configured cell identifier list is received through higher layer signaling.

12. The method of claim 2,
wherein the at least one specific signal comprises at least one of a channel state information-reference signal, a beam reference signal, a measurement reference signal or a synchronization signal block.

13. A user equipment reporting beam-related information in a wireless communication system, the user equipment comprising:
a radio frequency (RF) module configured to transmit and receive radio signals; and
a processor functionally connected to the RF module,
wherein the processor is configured to:
receive, from a base station, at least one specific signal for beam management,
report, to the base station, beam information for one or more beams based on a measurement result according to the at least one specific signal,
wherein the one or more beams are configured as one or more beam groups, and
wherein the beam information comprises information for whether to report information related to at least one beam included in each beam group,
receive, from the base station, a cell identifier list pre-configured to the beam management,
receive one or more synchronization signal blocks from at least one base station corresponding to at least one cell identifier included in the cell identifier list, and
report, to the base station, a measurement result by the received one or more synchronization signal blocks.

14. A method of reporting, by a user equipment, beam-related information in a wireless communication system, the method comprising:
receiving, from a serving base station, a cell identifier list pre-configured for beam management,
receiving one or more synchronization signal blocks from at least one neighbor base station corresponding to at least one cell identifier included in the cell identifier list and the serving base station, and
reporting, to the serving base station, a measurement result by the received one or more synchronization signal blocks,
wherein the measurement result comprises at least one of cell identifier information, index information of a synchronization signal block, or received power information.

* * * * *